United States Patent
Kimura

(10) Patent No.: US 9,448,407 B2
(45) Date of Patent: Sep. 20, 2016

(54) HEAD-MOUNTED DISPLAY DEVICE, CONTROL METHOD FOR HEAD-MOUNTED DISPLAY DEVICE, AND WORK SUPPORTING SYSTEM

(71) Applicant: Seiko Epson Corporation, Tokyo (JP)

(72) Inventor: Fusashi Kimura, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 206 days.

(21) Appl. No.: 14/095,827

(22) Filed: Dec. 3, 2013

(65) Prior Publication Data

US 2014/0168266 A1 Jun. 19, 2014

(30) Foreign Application Priority Data

Dec. 13, 2012 (JP) .................................. 2012-272166
Dec. 13, 2012 (JP) .................................. 2012-272167

(51) Int. Cl.
- *G09G 5/24* (2006.01)
- *G02B 27/01* (2006.01)
- *G06F 1/16* (2006.01)
- *G06F 3/01* (2006.01)

(52) U.S. Cl.
CPC ......... *G02B 27/0172* (2013.01); *G02B 27/017* (2013.01); *G06F 1/163* (2013.01); *G06F 3/011* (2013.01); *G02B 2027/014* (2013.01); *G02B 2027/0138* (2013.01); *G02B 2027/0141* (2013.01); *G02B 2027/0178* (2013.01)

(58) Field of Classification Search
CPC .................................................... G06T 19/006
USPC ......................................................... 345/633
See application file for complete search history.

(56) References Cited

U.S. PATENT DOCUMENTS

| | | | | |
|---|---|---|---|---|
| 6,067,371 A | * | 5/2000 | Gouge | A61B 5/015 374/E3.009 |
| 6,625,299 B1 | * | 9/2003 | Meisner | G01S 5/16 348/169 |
| 7,292,151 B2 | * | 11/2007 | Ferguson | 340/407.1 |
| 7,787,992 B2 | * | 8/2010 | Pretlove | G06F 3/011 700/259 |
| 8,957,861 B2 | * | 2/2015 | Kashitani | G06F 3/023 345/168 |
| 2001/0038361 A1 | * | 11/2001 | Tanijiri | G02B 27/0172 345/8 |
| 2002/0089544 A1 | * | 7/2002 | Jahn | G06F 3/011 715/778 |

(Continued)

FOREIGN PATENT DOCUMENTS

| | | |
|---|---|---|
| JP | 2002-23098 A | 1/2002 |
| JP | 2003-281297 A | 10/2003 |

(Continued)

OTHER PUBLICATIONS

Virtual Welder Trainer White, S.; Prachyabrued, M.; Baghi, D.; Aglawe, A.; Reiners, D.; Borst, C.; Chambers, T. Virtual Reality Conference, 2009. VR 2009. IEEE Year: 2009 pp. 303-303, DOI: 10.1109/VR.2009.4811066.*

(Continued)

*Primary Examiner* — Javid A Amini
(74) *Attorney, Agent, or Firm* — ALG Intellectual Property, LLC

(57) ABSTRACT

A head-mounted display device for enabling a user to simultaneously visually recognize a virtual image and an outside scene includes a warning-information generating unit configured to generate warning information, which is an image for calling the user's attention and an image display unit configured to cause the user to visually recognize the warning information as the virtual image.

29 Claims, 18 Drawing Sheets

(56) References Cited

U.S. PATENT DOCUMENTS

| | | | | |
|---|---|---|---|---|
| 2006/0022833 | A1* | 2/2006 | Ferguson | A63F 13/06 340/573.1 |
| 2006/0090135 | A1* | 4/2006 | Fukuda | G02B 27/017 715/727 |
| 2007/0096024 | A1* | 5/2007 | Furuya | G03B 7/22 250/332 |
| 2008/0005702 | A1* | 1/2008 | Skourup | G06F 3/011 715/848 |
| 2010/0033404 | A1* | 2/2010 | Hamadou | G06T 7/004 345/8 |
| 2011/0006047 | A1* | 1/2011 | Penrod | B23K 9/0956 219/137 R |
| 2011/0128364 | A1* | 6/2011 | Ono | G02B 27/017 348/78 |
| 2012/0127062 | A1* | 5/2012 | Bar-Zeev | G02B 3/14 345/6 |
| 2012/0139731 | A1* | 6/2012 | Razoumov | A61B 5/0022 340/573.1 |
| 2012/0194554 | A1 | 8/2012 | Kaino et al. | |
| 2012/0204307 | A1* | 8/2012 | De Mattei | A41D 1/002 2/69 |
| 2012/0298640 | A1* | 11/2012 | Conrardy | B23K 37/04 219/130.01 |
| 2012/0320046 | A1 | 12/2012 | Ihara et al. | |
| 2012/0320088 | A1 | 12/2012 | Ihara et al. | |
| 2013/0235347 | A1* | 9/2013 | Hennessey | G06F 3/013 351/210 |
| 2013/0331683 | A1* | 12/2013 | Wehberg | A61B 5/015 600/407 |
| 2014/0074345 | A1* | 3/2014 | Gabay | G07C 5/0841 701/31.4 |
| 2015/0056584 | A1* | 2/2015 | Boulware | B23K 9/173 434/234 |

FOREIGN PATENT DOCUMENTS

| | | |
|---|---|---|
| JP | 2004-021931 A | 1/2004 |
| JP | 2004-220201 A | 8/2004 |
| JP | 3735086 B | 1/2006 |
| JP | 2008-146778 A | 6/2006 |
| JP | 2010-144773 A | 7/2010 |
| JP | 2010-197153 A | 9/2010 |
| JP | 2011-114781 A | 6/2011 |
| JP | 2011-227879 A | 11/2011 |
| JP | 2012-155655 A | 8/2012 |

OTHER PUBLICATIONS

Virtual technical trainer: learning how to use milling machines with multi-sensory feedback in virtual reality Crison, F.; Lecuyer, A.; d'Huart, D.M.; Burkhardt, J.-M.; Michel, G.; Dautin, J.-L. Virtual Reality, 2005. Proceedings. VR 2005. IEEE Year: 2005 pp. 139-145, DOI: 10.1109/VR.2005.1492766.*

Effect of fiducial configuration on target registration eerror in image-guided surgery—A experiment study, Wenbin Zhang; Guofang Shen; Chenhao Wang; Yuncai Liu Biomedical Engineering and Informatics (BMEI), 2010 3rd International Conference on Year: 2010, vol. 4.*

A Two-level Information Filtering Model in Generating Warning Information Jun Ma; Jie Lu; Guangquan Zhang Computational Intelligence in Multicriteria Decision Making, IEEE Symposium on Year: 2007.*

Automatic generation of Dynamic Virtual Fences as part of BIM-based prevention program for construction safety Hammad, A.; Cheng Zhang; Setayeshgar, S.; Asen, Y.Simulation Conference (WSC), Proceedings of the 2012 Winter Year: 2012.*

Hirotaka Ishii, "Plant Maintenance Work Assistance Utilizing Augmented Reality," Image Laboratory, 2011, pp. 5-11, vol. 22, No. 2.

* cited by examiner

| WORK NUMBER | PROCEDURE NUMBER | PROCEDURE NAME | INSTRUCTION CONTENT | NEAR MISS CASE | ACCIDENT CASE | LIMITATION |
|---|---|---|---|---|---|---|
| 1 | 1 | CUTTING-OUT PROCESS (1) | PLEASE PREPARE TIMBER | NO | NO | NO |
| 1 | 2 | CUTTING-OUT PROCESS (2) | PLEASE ATTACH CIRCULAR SAW BLADE NO. XXX | NO | YES | OK OPERATION |
| .. | .. | .. | .. | .. | .. | .. |
| 1 | 11 | CUTTING PROCESS (1) | PLEASE PREPARE φ12 ROTARY DRILL | NO | NO | GLOVES ARE TAKEN OFF |
| 1 | 12 | CUTTING PROCESS (2) | PLEASE MOVE ROTARY DRILL TO NEAR PLACE WHERE TIP TOUCHES BOTTOM SURFACE OF WORK PIECE | NO | NO | NO |
| 1 | 13 | CUTTING PROCESS (3) | TURN ROTARY DRILL WHILE LOOKING AT SCALE TO OPEN HOLE TO POSITION OF DEPTH 50 | YES | YES | .. |
| .. | .. | .. | .. | .. | .. | .. |
| 1 | 24 | THREADING PROCESS (1) | CHANGE CUTTING TOOL TO THREADING TOOL NO. XXX AND CONFIRM THAT WORK PIECE IS FIXED | YES | YES | WORK PIECE IS ATTACHED |
| 1 | 25 | THREADING PROCESS (2) | PLEASE ATTACH REPLACEMENT GEAR NO. XXX | YES | NO | OK OPERATION |
| 1 | 26 | THREADING PROCESS (3) | SET POSITION OF TUMBLER AND LEVER TO XXX SWITCH FEED ROTATION, THREADING/FEED SWITCHING LEVER | | | OK OPERATION |
| 1 | 27 | THREADING PROCESS (4) | LOWER HALF NUT LEVER AND CUT THREAD UNTIL CUTTING TOOL MOVES TO THREAD UNDERCUT | | | |
| 2 | .. | .. | .. | .. | .. | .. |

FIG.12

HEAD-MOUNTED DISPLAY DEVICE, CONTROL METHOD FOR HEAD-MOUNTED DISPLAY DEVICE, AND WORK SUPPORTING SYSTEM

CROSS-REFERENCE

This application is based upon and claims priorities from Japanese Patent Application No. 2012-272166 filed on Dec. 13, 2012 and Japanese Patent Application No. 2012-272167 filed on Dec. 13, 2012, the entire contents of all of which are incorporated herein by reference.

BACKGROUND

1. Technical Field

The present invention relates to a head-mounted display device.

2. Related Art

There is known a technique called augmented reality (AR) for additionally presenting information in an actual environment using a computer. The augmented reality is mounted on, for example, head mounted display (hereinafter referred to as "head-mounted display device"). The head-mounted display device picks up an image of an outside scene with a camera, recognizes the picked-up image, and generates information for additional presentation. In a non-transmissive head-mounted display device that blocks the visual field of a user when the user wears the head-mounted display device, an image formed by superimposing a picked-up image and information for additional presentation one on top of the other is displayed on a liquid crystal screen. In a transmissive head-mounted display device that does not block the visual field of a user even when the user wears the head-mounted display device, an image representing information for additional presentation is displayed on a liquid crystal screen. In this way, the user can feel the augmented reality.

JP-A-2010-144773 describes a danger avoiding system that picks up a work area of a user, recognizes the picked-up image on the basis of dangerous area specifying information, and urgently stops a machine tool when a part of the body of the user is present within a dangerous area. JP-A-2010-197153 describes a technique for, in a work supporting device including a head mounted display, specifying information concerning components using a temperature distribution image acquired by an infrared image pickup unit and a visible ray image acquired by a visible ray image pickup unit, detecting a component having an abnormal temperature on the basis of a proper temperature database that stores proper temperatures of the components, and informing a user of the component. JP-A-2002-23098 describes a face-mounted simultaneous visual recognition device for infrared and visible videos capable of superimposing a visible image generated on the basis of light reception information of an infrared camera on an image directly viewed by a user via a half mirror and displaying the visible image. Japanese Patent No. 3735086 and JP-A-2011-114781 describe a head-mounted display device capable of generating, as information for additional presentation, work content and a work procedure concerning work performed by a user and presenting the information to the user.

Japanese Patent No. 3735086 and JP-A-2011-114781 describe a head-mounted display device that generates, as information for additional presentation, work content and a work procedure and presents the information to a user. JP-A-2010-144773 describes a danger avoiding system that recognizes a picked-up image of a work area of a user on the basis of dangerous area specifying information and urgently stops a machine tool when a part of the body of the user is present within a dangerous area. JP-A-2006-146778 describes a head-mounted display device capable of detecting an obstacle such as a step around a user with an infrared sensor, generating information for additional presentation for making the step or the like conspicuous, and presenting the information to the user.

In the techniques, since the image recognition is performed based on the dangerous area specifying information individually prepared in advance, it is difficult to cope with an unexpected danger. Similarly, in the techniques, since a component having an abnormal temperature is detected on the basis of the proper temperature database individually prepared in advance, it is difficult to cope with an unexpected danger. That is, the techniques have a problem in that, since information individually and specifically prepared in advance is necessary for estimating a warning point such as a danger, a method of estimating a warning point lacks versatility. The techniques have a problem in that it is difficult to inform the user of a warning point such as a danger. The techniques have a problem in that, since a visible image is superimposed on the entire area of the visual field of the user, the visual field of the user is excessively blocked. The techniques have a problem in that it is difficult to inform the user of a warning point such as a danger. Therefore, there has been a demand for a head-mounted display device capable of estimating a warning point such as a danger in the visual field direction of the user and calling the user's attention without requiring information concerning dangerous places individually prepared in advance.

Further, in the techniques, it is possible to support work performed by the user. However, it has been desired to reduce accidents by informing the user of a warning point such as a danger incidental to the work. The techniques have a problem in that it is difficult to support work performed by the user. Therefore, there has been a demand for a head-mounted display device capable of supporting work performed by the user and informing the user of a warning point such as a danger incidental to the work.

SUMMARY (1) An aspect of the invention provides a head-mounted display device for enabling a user to simultaneously visually recognize a virtual image and an outside scene. The head-mounted display device includes: an image acquiring unit configured to acquire an image in a visual field direction of the user in a wearing state of the head-mounted display device; a warning-information generating unit configured to generate warning information, which is an image for calling the user's attention, on the basis of the image acquired by the image acquiring unit; and an image display unit configured to cause the user to visually recognize the warning information as the virtual image. In the head-mounted display device according to this aspect, the warning-information generating unit generates the warning information on the basis of the image in the visual field direction of the user. The image display unit causes the user to visually recognize the generated warning information as the virtual image. Therefore, it is possible to realize the head-mounted display device capable of estimating a warning point such as a danger in the visual field direction of the user and calling the user's attention without requiring information concerning dangerous places individually prepared in advance.

(2) The head-mounted display device according to the aspect of the invention may be configured such that the warning-information generating unit specifies, from the image acquired by the image acquiring unit, a place where the user needs to be careful and generates warning information in which a predetermined image is arranged near the specified place. In the head-mounted display device according to this configuration, the warning-information generating unit generates the warning information in which the predetermined image is arranged near the place where the user needs to be careful. Therefore, the head-mounted display device can call the user's attention in a form that does not excessively block the visual field of the user. Since the predetermined image is arranged near the place where the user needs to be careful, the head-mounted display device can clearly inform the user of the place where the user needs to be careful.

(3) The head-mounted display device according to the aspect of the invention may be configured such that the image acquiring unit detects infrared light radiated from an object and acquires a temperature distribution image representing a distribution of temperature; and the warning-information generating unit specifies a place where the temperature is equal to or higher than a first threshold in the temperature distribution image acquired by the image acquiring unit and sets the place as the place where the user needs to be careful. With the head-mounted display device according to this configuration, the warning-information generating unit can estimate, by using the temperature distribution image and the threshold of the temperature, a warning point in the visual field direction of the user without requiring information concerning dangerous places individually prepared in advance.

(4) The head-mounted display device according to the aspect of the invention may be configured such that the image acquiring unit detects infrared light radiated from an object and acquires a temperature distribution image representing a distribution of temperature, and the warning-information generating unit specifies a place where the temperature is equal to or lower than a second threshold in the temperature distribution image acquired by the image acquiring unit and sets the place as the place where the user needs to be careful. With the head-mounted display device according to this configuration, the warning-information generating unit can estimate, by using the temperature distribution image and the threshold of the temperature, a warning point in the visual field direction of the user without requiring information concerning dangerous places individually prepared in advance.

(5) The head-mounted display device according to the aspect of the invention may be configured such that the image acquiring unit acquires an image representing the shape of an object from visible light radiated from the object, and the warning-information generating unit recognizes the image acquired by the image acquiring unit, specifies a part coinciding with a pattern stored in advance, and sets the coinciding part as the place where the user needs to be careful. With the head-mounted display device according to this configuration, the warning-information generating unit can estimate, using the image recognition and a method of pattern matching, a warning point in the visual field direction of the user without requiring information concerning dangerous places individually prepared in advance.

(6) The head-mounted display device according to the aspect of the invention may be configured such that the pattern includes an acute angle part. With the head-mounted display device according to this configuration, the warning-information generating unit can estimate, by specifying the acute angle part in the image recognition, a warning point in the visual field direction of the user without requiring information concerning dangerous places individually prepared in advance.

(7) The head-mounted display device according to the aspect of the invention may be configured such that the predetermined image is an image formed by a character, a pattern, or a figure that reminds the user of a warning or a combination of the character, the pattern, and the figure. With the head-mounted display device according to this configuration, since the predetermined image is the image formed by character, a pattern, or a figure that reminds the user of a warning or a combination of the character, the pattern, and the figure, it is possible to clearly inform the user to the effect that the user should be careful.

(8) The head-mounted display device according to the aspect of the invention may be configured such that the predetermined image is an image formed by a figure having a shape corresponding to the shape of the specified place. With the head-mounted display device according to this configuration, since the predetermined image is the image formed by a figure having a shape corresponding to the shape of the specified place, it is possible to clearly inform the user of a place where the user should be careful.

(9) The head-mounted display device according to the aspect of the invention may be configured such that the predetermined image is an image obtained by extracting, from the temperature distribution image acquired by the image acquiring unit, a place where temperature is equal to or higher than the first threshold or a place where temperature is equal to or lower than the second threshold. With the head-mounted display device according to this configuration, since the predetermined image is the image extracted from the temperature distribution image, it is possible to clearly inform the user of a temperature distribution and a temperature change in a place where the user should be careful. Since the predetermined image is the image obtained by extracting, from the temperature distribution image, the place where temperature exceeds the threshold, it is possible to call the user's attention in a form that does not excessively block the visual field of the user.

(10) The head-mounted display device according to the aspect of the invention may be configured such that the warning-information generating unit generates the warning information for an overlapping area where a display area of the virtual image and an acquisition area of the image acquiring unit overlap each other in the image acquired by the image acquiring unit. In the head-mounted display device according to this configuration, the warning-information generating unit generates the warning information for the overlapping area of the display area of the virtual image and the acquisition area of the image acquiring unit. Therefore, it is possible to reduce the occurrence of "a shift between an image directly viewed by the user in the visual field of the user and a virtual image that the user is caused to visually recognize by the image display unit", which is the problem that occurs in the transmissive head-mounted display device. As a result, it is possible to reduce a sense of discomfort given to the user when the user is caused to visually recognize the warning information as the virtual image.

(11) The head-mounted display device according to the aspect of the invention may be configured such that the head-mounted display device further include a sounding body, and the warning-information generating unit causes, on the basis of the image acquired by the image acquiring unit, the sounding body to output sound for calling the user's attention. With the head-mounted display device according to this configuration, the warning-information generating unit can further call the user's attention through sound.

(12) The head-mounted display device according to the aspect of the invention may be configured such that the head-mounted display device further includes a tactile stimulation unit configured to apply stimulation through a tactile sense to the user, and the warning-information generating unit actuates, on the basis of the image acquired by the image acquiring unit, the tactile stimulation unit in order to call the user's attention. With the head-mounted display device according to this configuration, the warning-information generating unit can further call the user's attention using stimulation through a tactile sense.

(13) Another aspect of the invention provides a head-mounted display device for enabling a user to simultaneously visually recognize a virtual image and an outside scene. The head-mounted display device includes: a procedure managing unit configured to generate procedure information, which is an image representing content that the user should carry out, concerning the present procedure; a warning-information generating unit configured to generate warning information, which is an image for calling the user's attention, in the present procedure; and an image display unit configured to cause the user to visually recognize the procedure information and the warning information as the virtual image. In the head-mounted display device according to this aspect, the image display unit causes the user to visually recognize, as the virtual image, both of the procedure information representing content that the user should carry out concerning the present procedure and the warning information for calling the user's attention when at least one of an accident and a near miss occurred in the past. Therefore, it is possible to realize the head-mounted display device capable of supporting work performed by the user and informing the user of a warning point incidental to the work.

(14) The head-mounted display device according to the aspect of the invention may be configured such that the warning-information generating unit generates the warning information when warning point data stored in advance is present in the present procedure. With the head-mounted display device according to this configuration, the warning-information generating unit can generate the warning information when warning point data stored in advance is present for the present step.

(15) The head-mounted display device according to the aspect of the invention may be configured such that the head-mount display device further includes an image acquiring unit configured to acquire an image in a visual field direction of the user in a wearing state of the head-mounted display device, and the procedure managing unit specifies, on the basis of the image acquired by the image acquiring unit, the present procedure from a plurality of procedures included in work. With the head-mounted display device according to this configuration, the procedure managing unit can automatically specify, on the basis of the image in the visual field direction of the user, the present procedure from the plurality of procedures included in the work.

(16) The head-mounted display device according to the aspect of the invention may be configured such that the procedure managing unit generates the procedure information corresponding to the present procedure using association of information representing the procedure included in the work and information representing content that the user should carry out in the procedure. With the head-mounted display device according to this configuration, the procedure managing unit can easily generate the procedure information using the association of the procedure and the content that the user should carry out in the procedure.

(17) The head-mounted display device according to the aspect of the invention may be configured such that the warning point data stored in advance is data associating information representing the procedure included in the work and information concerning at least one of an accident in the past and a near miss in the past in the procedure and the warning-information generating unit generates, using the warning point data, the warning information corresponding to the present procedure. With the head-mounted display device according to this configuration, the warning-information generating unit can easily generate warning information using the association of the procedure and the information concerning an accident or a near miss in the past in the procedure.

(18) The head-mounted display device according to the aspect of the invention may be configured such that the procedure managing unit limits generation of the procedure information corresponding to the next procedure until the procedure managing unit succeeds in predetermined check processing after generating the procedure information corresponding to the present procedure. With the head-mounted display device according to this configuration, the procedure managing unit can perform the predetermined check processing before the procedure managing unit transitions to generation of procedure information for informing the next procedure after generating the procedure information for informing the present procedure. Therefore, it is possible to improve safety of work in a procedure.

(19) The head-mounted display device according to the aspect of the invention may be configured such that the predetermined check processing is acquisition of an indication of intension for check from the user. With the head-mounted display device according to this configuration, the procedure managing unit can improve safety of work in a procedure by performing some check for the user between the present procedure and the next procedure and acquiring an indication of intension for check from the user.

(20) The head-mounted display device according to the aspect of the invention may be configured such that the predetermined check processing is processing for recognizing the image acquired by the image acquiring unit and checking whether a result of the image recognition satisfies a condition set in advance. With the head-mounted display device according to this configuration, the procedure managing unit can improve safety of work in a procedure by recognizing an image in the visual field direction of the user between the present procedure and the next procedure and checking whether a result of the image recognition satisfies the condition set in advance.

(21) The head-mounted display device according to the aspect of the invention may be configured such that the condition set in advance varies according to characteristics of the user including at least any one of age, sex, physique, and proficiency in work of the user. With the head-mounted display device according to this configuration, the procedure managing unit can vary a condition for collating a result of the image recognition according to the characteristics of the user including at least any one of age, sex, physique, and proficiency in work of the user. Therefore, it is possible to perform fine check processing corresponding to the characteristics of the user.

(22) The head-mounted display device according to the aspect of the invention may be configured such that the warning-information generating unit generates different kinds of the warning information when an accident occurred in the past in the present procedure and when a near miss occurred in the past in the present procedure. With the head-mounted display device according to this configuration, the warning-information generating unit generates the different kinds of the warning information when an accident occurred in the past and when a near miss occurred in the past in the present procedure. Therefore, the user can learn whether a case that occurred in the past in the present procedure is an accident or a near miss.

(23) The head-mounted display device according to the aspect of the invention may be configured such that the warning-information generating unit generates different kinds of the warning information according to characteristics of the user including at least any one of age, sex, physique, and proficiency in work of the user. With the head-mounted display device according to this configuration, the warning-information generating unit can generate the different kinds of the warning information according to the characteristics of the user including at least any one of age, sex, physique, and proficiency in work of the user. Therefore, it is possible to perform fine generation of warning information corresponding to the characteristics of the user.

(24) The head-mounted display device according to the aspect of the invention may be configured such that the procedure managing unit generates the procedure information for an overlapping area where a display area of the virtual image and an acquisition area of the image acquiring unit overlap each other in the image acquired by the image acquiring unit, and the warning-information generating unit generates the warning information for the overlapping area. In the head-mounted display device according to this configuration, the procedure managing unit and the warning-information generating unit respectively generate the procedure information and the warning information for the overlapping area where the display area of the virtual image and the acquisition area of the image acquiring unit overlap each other. Therefore, it is possible to reduce the occurrence of "a shift between an image directly viewed by the user in the visual field of the user and a virtual image that the user is caused to visually recognize by the image display unit", which is the problem that occurs in the transmissive head-mounted display device. As a result, it is possible to reduce a sense of discomfort given to the user when the user is caused to visually recognize the procedure information and the warning information as the virtual image.

(25) The head-mounted display device according to the aspect of the invention may be configured such that the head-mounted display device further includes a sounding body, and the warning-information generating unit causes, on the basis of the information concerning at least one of an accident in the past and a near miss in the past corresponding to the present procedure, the sounding body to output sound for calling the user's attention. With the head-mounted display device according to this configuration, the warning-information generating unit can further call the user's attention through sound.

(26) The head-mounted display device according to the aspect of the invention may be configured such that the head-mounted display device further includes a tactile stimulation unit configured to apply stimulation through a tactile sense to the user, and the warning-information generating unit actuates, on the basis of the information concerning at least one of an accident in the past and a near miss in the past corresponding to the present procedure, the tactile stimulation unit in order to call the user's attention. With the head-mounted display device according to this configuration, the warning-information generating unit can further call the user's attention using stimulation through a tactile sense.

(27) Still another aspect of the invention provides a work supporting system. The work supporting system includes: the head-mounted display device according to the aspect explained above; and a server. The server includes: a first table configured to store association of the information representing the procedure included in the work and the information representing content that the user should carry out in the procedure; a second table configured to store association of the information representing the procedure included in the work and the information concerning at least one of an accident in the past and a near miss in the past in the procedure; and a transmitting unit configured to transmit, according to a request from the head-mounted display device, at least one of the information stored in the first table and the information stored in the second table. With the work supporting system according to this aspect, it is possible to store the first table and the second table in the server, which is an apparatus different from the head-mounted display device. The head-mounted display device can acquire the information of the first and second tables from the server. Consequently, a plurality of the head-mounted display devices can share the information of the first and second tables stored in one server. As a result, compared with a configuration including the first and second tables in each of the head-mounted display devices, labor and time required for update of the tables are reduced.

Not all of the plurality of components in the aspects of the invention are essential. In order to solve a part or all of the problems explained above or in order to attain a part or all of the effects described in this specification, it is possible to appropriately perform, concerning a part of the plurality of components, change, deletion, replacement with new components, and partial deletion of limited contents of the components. In order to solve a part or all of the problems explained above or in order to attain a part or all of the effects described in this specification, it is also possible to form an independent aspect of the invention by combining a part or all of the technical features included in one aspect of the invention explained above with a part or all of the technical features included in the other aspects of the invention.

For example, one aspect of the invention can be realized as a device including a part or all of the three components, i.e., the image acquiring unit, the warning-information generating unit, and the image display unit. That is, the device may include the image acquiring unit or may not include the image acquiring unit. The device may include the warning-information generating unit or may not include the warning-information generating unit. The device may include the image display unit or may not include the image display unit. Such a device can be realized as, for example, a head-mounted display device but can also be realized as a device other than the head-mounted display device. A part or all of the technical features of the head-mounted display devices according to the aspects can be applied to this device.

The invention can be implemented in various forms. The invention can be implemented in forms such as a head-mounted display device and a control method for the head-mounted display device, a work supporting device and a control method for a work supporting device, a work supporting system, a computer program for realizing functions of the methods, the devices, or the system, and a non-temporary recording medium having the computer program recorded thereon.

BRIEF DESCRIPTION OF THE DRAWINGS

The invention will be described with reference to the accompanying drawings, wherein like numbers reference like elements.

FIG. 12 is an explanatory diagram showing an example of a procedure management table.

DESCRIPTION OF EXEMPLARY EMBODIMENTS

A. First Embodiment
A-1. Configuration of a Head-Mounted Display Device

Figure 1:
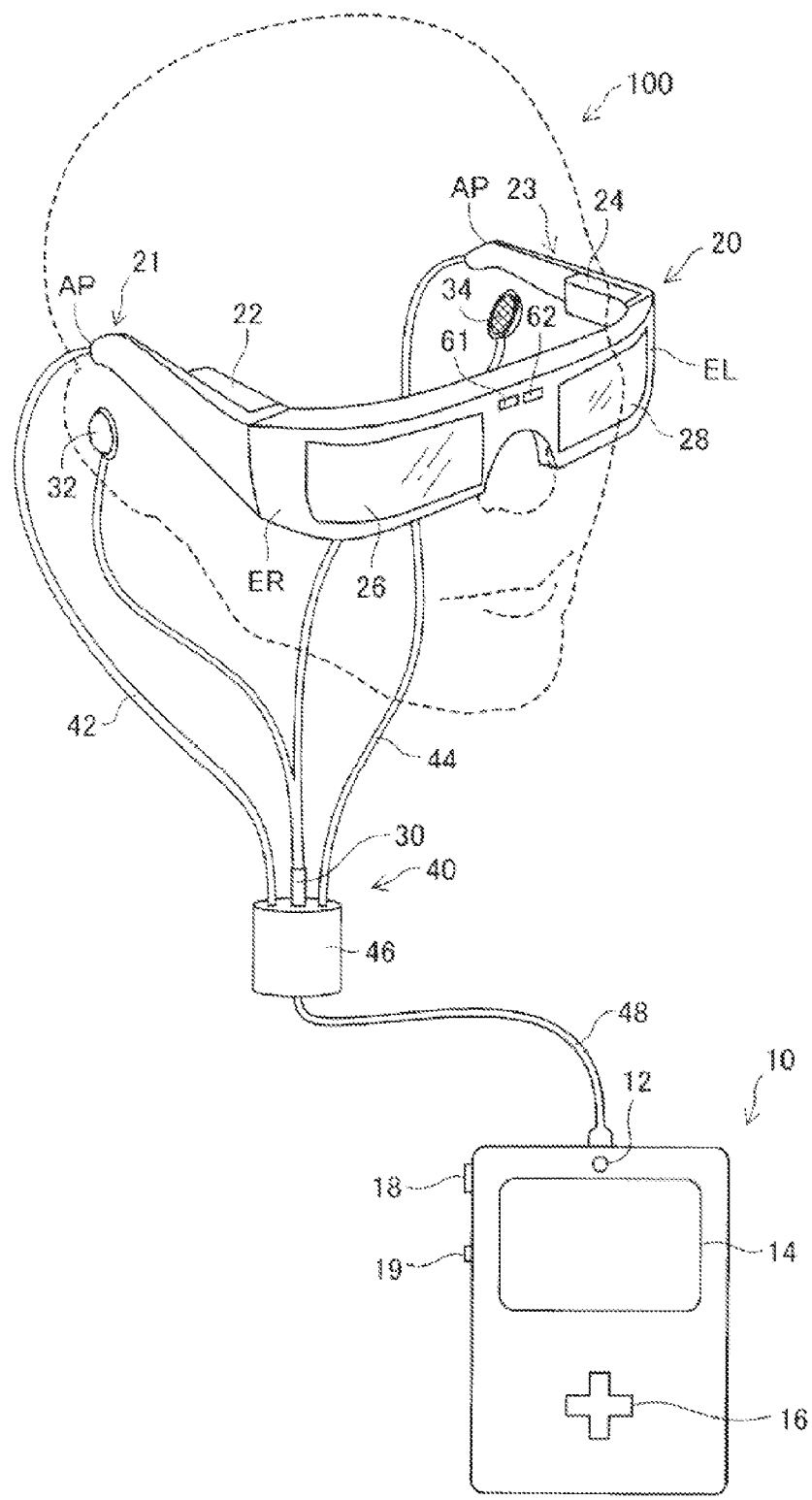
FIG. 1 is an explanatory diagram showing the schematic configuration of a head-mounted display device in a first embodiment of the invention.

FIG. 1 is an explanatory diagram showing the schematic configuration of a head-mounted display device in a first embodiment of the invention. A head-mounted display device 100 is a display device mounted on the head and is also called head mounted display (HMD). The head mounted display 100 in this embodiment is an optically transmissive head-mounted display device for enabling a user to directly visually recognize an outside scene simultaneously with visually recognizing a virtual image.

The head mounted display 100 includes an image display unit 20 configured to cause the user to visually recognize a virtual image in a state in which the head mounted display 100 is mounted on the head of the user and a control unit (a controller) 10 configured to control the image display unit 20.

The image display unit 20 is a mounted body mounted on the head of the user. In this embodiment, the image display unit 20 has an eyeglass shape. The image display unit 20 includes a right holding unit 21, a right display driving unit 22, a left holding unit 23, a left display driving unit 24, a right optical-image display unit 26, a left optical-image display unit 28, a camera 61, and a thermography 62. The right optical-image display unit 26 and the left optical-image display unit 28 are respectively arranged to be located in front of the right and left eyes of the user when the user wears the image display unit 20. One end of the right optical-image display unit 26 and one end of the left optical-image display unit 28 are connected to each other in a position corresponding to the area between the eyebrows of the user when the user wears the image display unit 20.

The right holding unit 21 is a member provided to extend from an end ER, which is the other end, of the right optical-image display unit 26 to a position corresponding to the temporal region of the user when the user wears the image display unit 20. Similarly, the left holding unit 23 is a member provided to extend from an end EL, which is the other end, of the left optical-image display unit 28 to a position corresponding to the temporal region of the user when the user wears the image display unit 20. The right holding unit 21 and the left holding unit 23 hold the image display unit 20 on the head of the user like temples of eyeglasses.

The right display driving unit 22 is arranged on the inner side of the right holding unit 21, in other words, a side opposed to the head of the user when the user wears the image display unit 20. The left display driving unit 24 is arranged on the inner side of the left holding unit 23. In the following explanation, the right holding unit 21 and the left holding unit 23 are collectively simply referred to as "holding unit" as well. The right display driving unit 22 and the left display driving unit 24 are collectively simply referred to as "display driving unit" as well. The right optical-image display unit 26 and the left optical-image display unit 28 are collectively simply referred to as "optical-image display unit" as well.

The display driving unit includes liquid crystal displays (hereinafter referred to as "LCDs") 241 and 242 and projection optical systems 251 and 252 (see FIG. 2). Details of the configuration of the display driving unit are explained below. The optical-image display unit functioning as an optical member includes light guide plates 261 and 262 (see FIG. 2) and dimming plates. The light guide plates 261 and 262 are formed of a light transmissive resin material or the like and guide image light output from the display driving unit to the eyes of the user. The dimming plates are thin plate-like optical elements and are arranged to cover the front side (a side opposite to the side of the eyes of the user) of the image display unit 20. The dimming plates protect the light guide plates 261 and 262 and suppress, for example, damage to the light guide plates 261 and 262 and adhesion of stains to the light guide plates 261 and 262. It is possible to adjust an external light amount and adjust easiness of visual recognition of a virtual image by adjusting the light transmittance of the dimming plates. The dimming plates can be omitted.

The camera 61 and the thermography 62 are arranged in a position corresponding to the area between the eyebrows of the user when the user wears the image display unit 20. The camera 61 picks up an image of an outside scene (a scene on the outside) in the front side direction of the image display unit 20, in other words, the visual field direction of the user in a wearing state of the head mounted display 100 and acquires an outside scene image. The camera 61 is a so-called visible light camera. The outside scene image acquired by the camera 61 is an image representing the shape of an object from visible light radiated from the object. The camera 61 in this embodiment is a monocular camera but may be a stereo camera. Like the camera 61, the thermography 62 picks up an image of an outside scene in the front side direction of the image display unit 20 and acquires a temperature distribution image. The thermography 62 is a so-called infrared thermography. The thermography 62 detects an infrared ray radiated from an object, converts an energy amount of the detected infrared ray into temperature, and generates a temperature distribution image (an infrared thermal image) representing a distribution of temperature. The camera 61 and the thermography 62 function as the "image acquiring unit" as well.

The image display unit 20 further includes a connecting unit 40 for connecting the image display unit 20 to the control unit 10. The connecting unit 40 includes a main body cord 48 connected to the control unit 10, a right cord 42 and a left cord 44, which are two cords branching from the main body cord 48, and a coupling member 46 provided at a branch point. The right cord 42 is inserted into a housing of the right holding unit 21 from a distal end portion AP in the extending direction of the right holding unit 21 and connected to the right display driving unit 22. Similarly, the left cord 44 is inserted into a housing of the left holding unit 23 from a distal end portion AP in the extending direction of the left holding unit 23 and connected to the left display driving unit 24. A jack for connecting an earphone plug 30 is provided in the coupling member 46. A right earphone 32 and a left earphone 34 extend from the earphone plug 30.

The image display unit 20 and the control unit 10 perform transmission of various signals via the connecting unit 40. Connectors (not shown in the figures), which fit with each other, are respectively provided in an end portion on the opposite side of the coupling member 46 in the main body cord 48 and the control unit 10. The control unit 10 and the image display unit 20 are connected and disconnected according to fitting and unfitting of the connector of the main body cord 48 and the connector of the control unit 10. As the right cord 42, the left cord 44, and the main body cord 48, for example, a metal cable or an optical fiber can be adopted.

The control unit 10 is a device for controlling the head mounted display 100. The control unit 10 includes a lighting unit 12, a touch pad 14, a cross key 16, and a power switch 18. The lighting unit 12 notifies, with a light emission form thereof, an operation state (e.g., ON or OFF of a power supply) of the head mounted display 100. As the lighting unit 12, for example, an LED (Light Emitting Diode) can be used. The touch pad 14 detects contact operation on an operation surface of the touch pad 14 and outputs a signal corresponding to detection content. As the touch pad 14, various touch pads of an electrostatic type, a pressure detection type, and an optical type can be adopted. The cross key 16 detects pressing operation of keys corresponding to up, down, left, and right directions and outputs a signal corresponding to detection content. The power switch 18 detects slide operation of the switch to switch a state of the power supply for the head mounted display 100.

Figure 2:
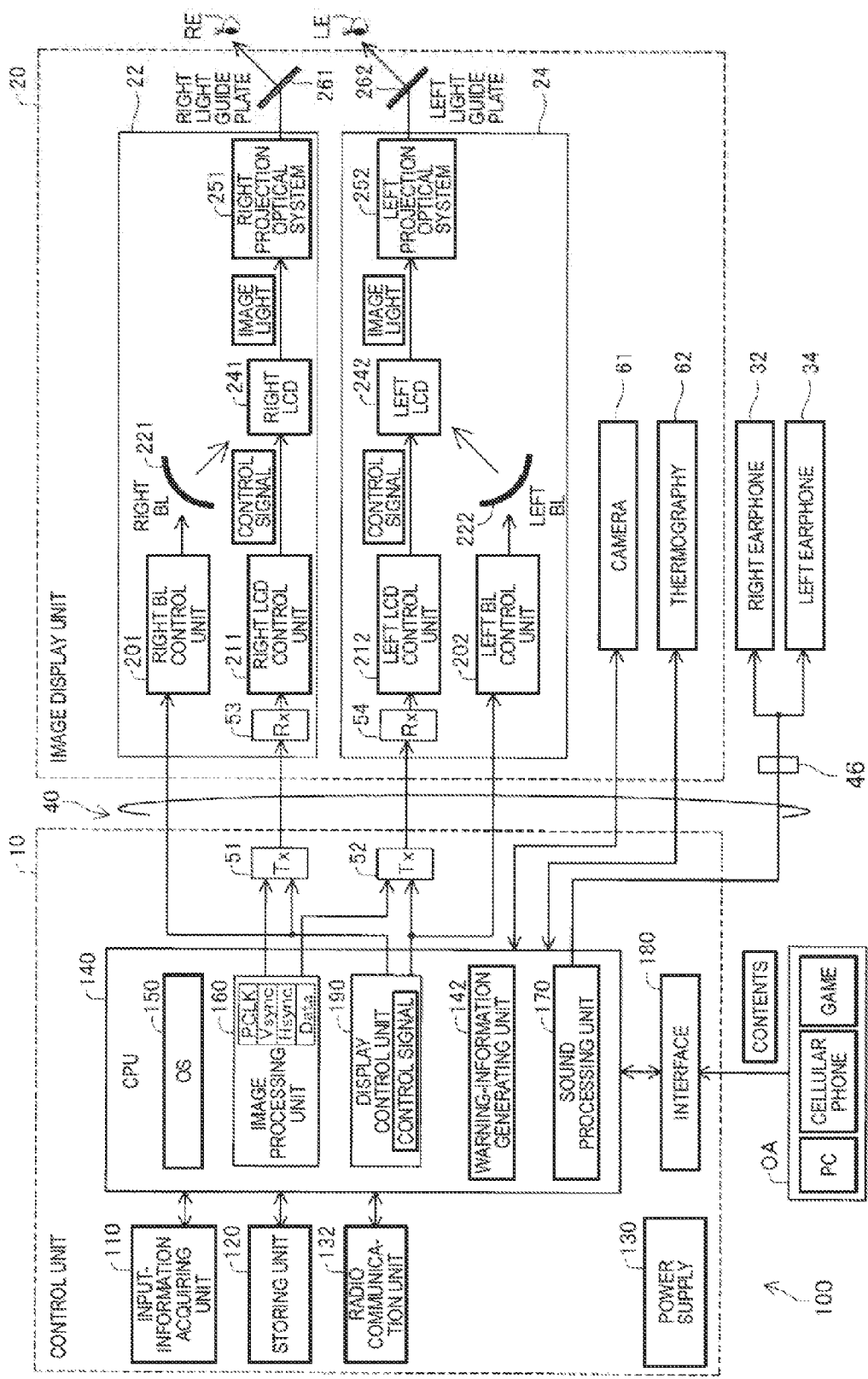
FIG. 2 is a block diagram functionally showing the configuration of a head mounted display.

FIG. 2 is a block diagram functionally showing the configuration of the head mounted display 100. The control unit 10 includes an input-information acquiring unit 110, a storing unit 120, a power supply 130, a radio communication unit 132, a CPU 140, an interface 180, and transmitting units (Tx) 51 and 52, which are connected to one another by a not-shown bus.

The input-information acquiring unit 110 acquires, for example, a signal corresponding to an operation input to the touch pad 14, the cross key 16, or the power switch 18. The storing unit 120 is configured by a ROM, a RAM, a DRAM, a hard disk, or the like. The power supply 130 supplies electric power to the units of the head mounted display 100. As the power supply 130, for example, a secondary battery can be used. The radio communication unit 132 performs radio communication with other apparatuses according to a predetermined radio communication standard such as a wireless LAN or a Bluetooth.

The CPU 140 reads out and executes a computer program stored in the storing unit 120 to thereby function as an operating system (OS) 150, an image processing unit 160, a sound processing unit 170, a display control unit 190, and a warning-information generating unit 142. The warning-information generating unit 142 is an application program for executing attention calling processing. The attention calling processing is processing for estimating a warning point in the visual field direction of the user on the basis of the outside scene image acquired by the camera 61 or the temperature distribution image acquired by the thermography 62 and calling the user's attention.

The image processing unit 160 generates a signal on the basis of contents (a video) input via the interface 180 or the radio communication unit 132. The image processing unit 160 supplies the generated signal to the image display unit 20 via the connecting unit 40. The signal to be supplied to the image display unit 20 is different in an analog format and a digital format. In the case of the analog format, the image processing unit 160 generates and transmits a clock signal PCLK, a vertical synchronization signal VSync, a horizontal synchronization signal HSync, and image data Data. Specifically, The image processing unit 160 acquires an image signal included in the contents. The acquired image signal is, for example, in the case of a moving image, an analog signal generally including thirty frame images per one second. The image processing unit 160 separates synchronization signals such as the vertical synchronization signal VSync and the horizontal synchronization signal HSync from the acquired image signal and generates a clock signal PCLK using a PLL circuit or the like according to cycles of the synchronization signals. The image processing unit 160 converts the analog image signal, from which the synchronization signals are separated, into a digital image signal using an A/D conversion circuit or the like. The image processing unit 160 stores the digital image signal after the conversion in a DRAM in the storing unit 120 frame by frame as image data Data of RGB data. On the other hand, in the case of the digital format, the image processing unit 160 generates and transmits a clock signal PCLK and image data Data. Specifically, when the contents are the digital format, the clock signal PCLK is output in synchronization with the image signal. Therefore, the generation of the vertical synchronization signal VSync and the horizontal synchronization signal HSync and the A/D conversion for analog image signal are unnecessary. The image processing unit 160 may execute image processing such as resolution conversion processing, various kinds of tone correction processing for adjustment of luminance and chroma, and keystone correction processing on the image data Data stored in the storing unit 120.

The image processing unit 160 transmits the clock signal PCLK, the vertical synchronization signal VSyn, and the horizontal synchronization signal HSync generated by the image processing unit 160 and the image data Data stored in the DRAM in the storing unit 120 respectively via the transmitting units 51 and 52. The image data Data transmitted via the transmitting unit 51 is referred to as "image data for right eye" as well. The image data Data transmitted via the communication unit 52 is referred to as "image data for left eye" as well. The transmitting units 51 and 52 function as a transceiver for serial transmission between the control unit 10 and the image display unit 20.

The display control unit 190 generates control signals for controlling the right display driving unit 22 and the left display driving unit 24. Specifically, the display control unit 190 individually controls, using the control signals, ON/OFF of driving of the right LCD 241 by a right LCD control unit 211, ON/OFF of driving of a right backlight 221 by a right backlight control unit 201, ON/OFF of driving of a left LCD 242 by a left LCD control unit 212, and ON/OFF of driving of a left backlight 222 by a left backlight control unit 202 to thereby control generation and emission of image lights by the right display driving unit 22 and the left display driving unit 24. For example, the display control unit 190 causes both of the right display driving unit 22 and the left display driving unit 24 to generate image lights, causes one of the right display driving unit 22 and the left display driving unit 24 to generate image light, or causes both of the right display driving unit 22 and the left display driving unit 24 not to generate image light. The display control unit 190 transmits control signals to the right LCD control unit 211 and the left LCD control unit 212 respectively via the transmitting units 51 and 52. The display control unit 190 transmits control signals respectively to the right backlight control unit 201 and the left backlight control unit 202.

The sound processing unit 170 acquires a sound signal included in the contents, amplifies the acquired sound signal, and supplies the amplified sound signal to a not-shown speaker in the right earphone 32 or a not-shown speaker in the left earphone 34 connected to the coupling member 46. For example, when a Dolby (registered trademark) system is adopted, processing for the sound signal is performed. Different sounds, for example, the frequencies or the like of which are varied, are respectively output from the right earphone 32 and the left earphone 34.

The interface 180 is an interface for connecting various external apparatuses OA, which are supply sources of contents, to the control unit 10. Examples of the external apparatuses OA include a personal computer PC, a cellular phone terminal, and a game terminal. As the interface 180, for example, a USB interface, a micro USB interface, or an interface for a memory card can be used.

The image display unit 20 includes the right display driving unit 22, the left display driving unit 24, the right light guide plate 261 functioning as the right optical-image display unit 26, the left light guide plate 262 functioning as the left optical-image display unit 28, and the camera 61.

The right display driving unit 22 includes a receiving unit (Rx) 53, the right backlight (BL) control unit 201 and the right backlight (BL) 221 functioning as a light source, the right LCD control unit 211 and the right LCD 241 functioning as a display element, and the right projection optical system 251. The right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is, for example, a light emitting body such as an LED or an electroluminescence (EL). The right LCD control unit 211 drives the right LCD 241 on the basis of the clock signal PCLK, the vertical synchronization signal VSync, the horizontal synchronization signal HSync, and image data for right eye Data1 input via the receiving unit 53. The right LCD 241 is a transmissive liquid crystal panel on which a plurality of pixels are arranged in a matrix shape.

The right projection optical system 251 is configured by a collimate lens that changes image light emitted from the right LCD 241 to light beams in a parallel state. The right light guide plate 261 functioning as the right optical-image display unit 26 guides the image light output from the right projection optical system 251 to a right eye RE of the user while reflecting the image light along a predetermined optical path. The right projection optical system 251 and the right light guide plate 261 are collectively referred to as "light guide unit" as well. For the light guide unit, an arbitrary system can be used as long as the light guide unit forms a virtual image in front of the eyes of the user using the image light. For example, a diffraction grating may be used or a semitransparent reflection film may be used.

The left display driving unit 24 has a configuration same as the configuration of the right display driving unit 22. That is, the left display driving unit 24 includes a receiving unit (Rx) 54, the left backlight (BL) control unit 202 and the left backlight (BL) 222 functioning as a light source, the left LCD control unit 212 and the left LCD 242 functioning as a display element, and the left projection optical system 252. Detailed explanation of the left display driving unit 24 is omitted.

Figure 3:
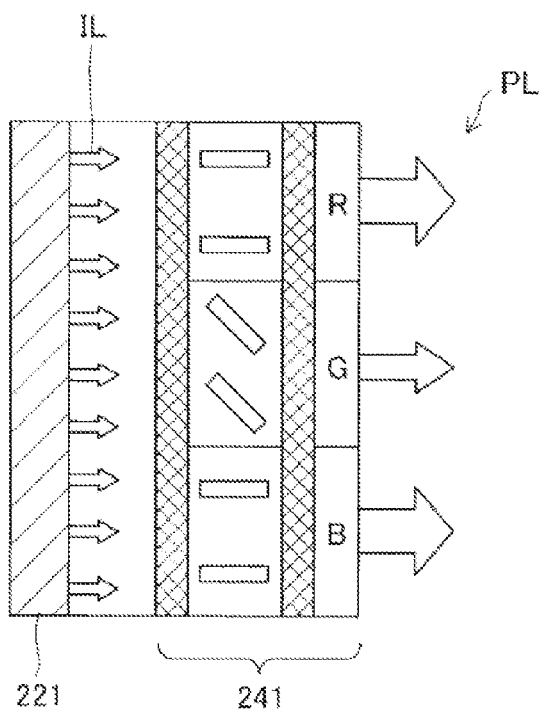
FIG. 3 is an explanatory diagram showing a state in which image light is emitted by an image-light generating unit.

FIG. 3 is an explanatory diagram showing a state in which image light is emitted by the image-light generating unit. The right LCD 241 drives liquid crystals in respective pixel positions arranged in a matrix shape to change the transmittance of light transmitted through the right LCD 241 to thereby modulate illumination light IL irradiated from the right backlight 221 into effective image light PL representing an image. The same applies to the left side. As shown in FIG. 3, in this embodiment, the backlight system is adopted. However, the image light may be emitted using a front light system or a reflection system.

Figure 4:
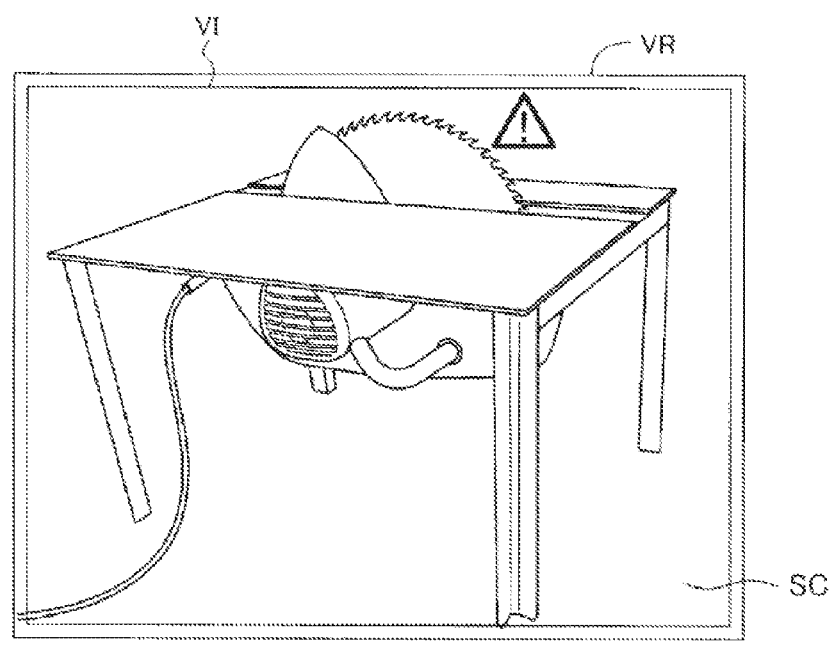
FIG. 4 is an explanatory diagram showing an example of a virtual image recognized by a user.

FIG. 4 is an explanatory diagram showing an example of a virtual image recognized by the user. A visual field VR of the user is illustrated in FIG. 4. As explained above, the image lights guided to both the eyes of the user of the head mounted display 100 are imaged on the retinas of the user, whereby the user visually recognizes a virtual image VI. In portions other than a portion where the virtual image VI is displayed in the visual field VR of the user, the user visually recognizes an outside scene SC through the right optical-image display unit 26 and the left optical-image display unit 28. In the example shown in FIG. 4, the outside scene SC is a scene of a workshop where a table saw is placed. In the head mounted display 100, the user can also visually recognize the outside scene SC behind the virtual image VI in a portion overlapping the virtual image VI in the visual field VR.

A-2. Attention Calling Processing

Figure 5:
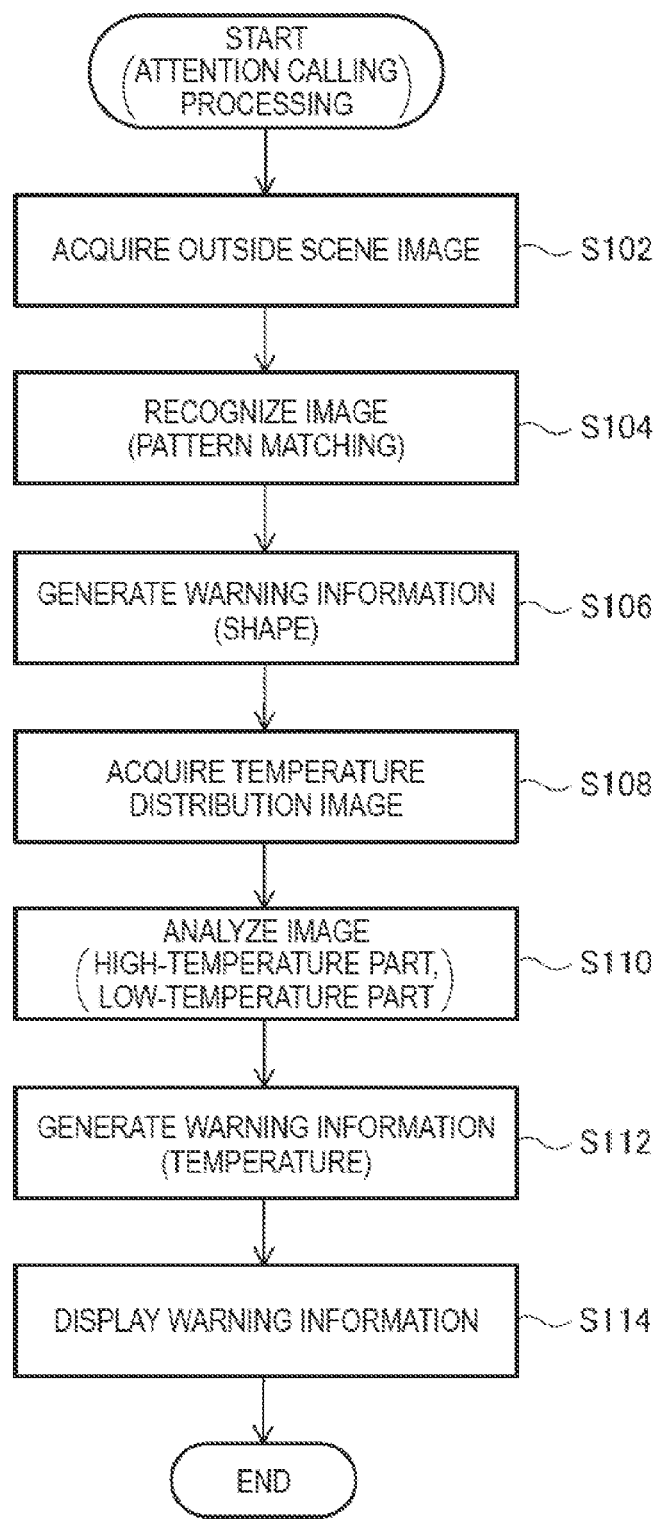
FIG. 5 is a flowchart for explaining a procedure of attention calling processing in the first embodiment.

FIG. 5 is a flowchart for explaining a procedure of attention calling processing in the first embodiment. The attention calling processing is processing for estimating a warning point in the visual field direction of the user and calling the user's attention. A start trigger of the attention calling processing can be arbitrarily set. For example, the start of the head mounted display 100, in other words, the detection of power-on may be set as the start trigger. For example, a processing start request from the OS 150 or a specific application may be set as the start trigger. When the attention calling processing is invoked from the specific application and executed, the attention calling processing operates as a subroutine of the specific application.

The warning-information generating unit 142 acquires an outside scene image from the camera 61 (step S102). Specifically, the warning-information generating unit 142 starts the camera 61, instructs the camera 61 to perform image pickup, and acquires an outside scene image picked up by the camera 61.

Figure 6:
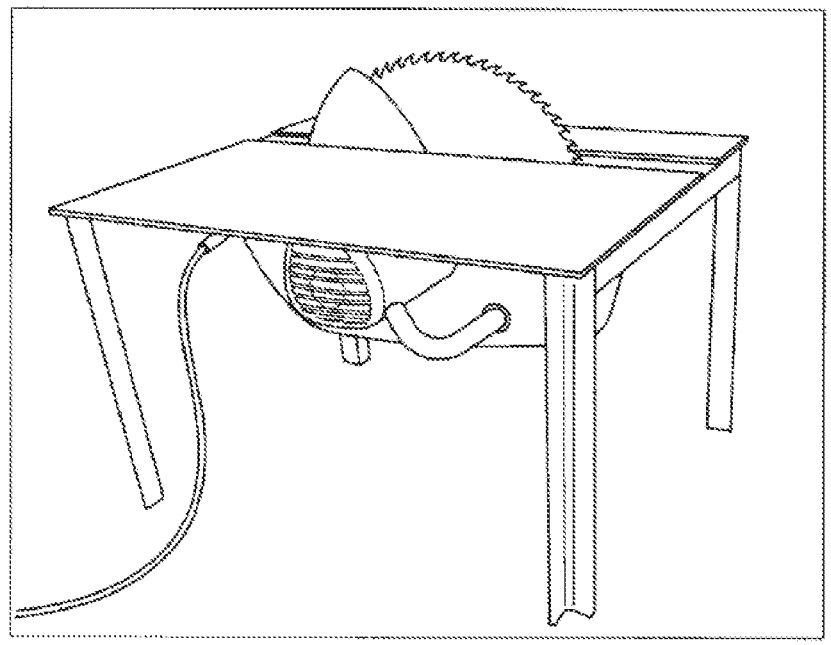
FIG. 6 is an explanatory diagram showing an example of an outside scene image picked up by a camera.

FIG. 6 is an explanatory diagram showing an example of the outside scene image picked up by the camera 61. In the example shown in FIG. 6, the outside scene image is an image of the workshop where the table saw is placed. After acquiring the outside scene image, the warning-information generating unit 142 recognizes the outside scene image to thereby estimate a warning point in the visual field direction of the user (step S104 in FIG. 5). In this embodiment, the warning point in the visual field direction of the user means a dangerous place or and a place where a danger is predicted among places present in the direction of the line of sight of the user in the wearing state of the head mounted display 100. In step S104, specifically, places described below are regarded as "the dangerous place or the place where a danger is predicted".

(a1) An acute angle part where the user is likely to have the body or clothes cut. For example, the saw blade of the table saw, a jig of a cutting machine, and a tip tool of a rotary drill.

(a2) A catching part where the user is likely to have the body or clothes caught. For example, a holster and a slide of a pressing machine and a table and a frame of a machining center.

(a3) A roll-in part where the user is likely to have the body or clothes rolled in. For example, a roller of a circular saw machine and agitating blades of an agitator.

The warning-information generating unit 142 recognizes the outside scene image and specifies a part coinciding with a pattern stored in the storing unit 120 in advance to thereby specify places corresponding to the places (a1) to (a3). In the example of the outside scene image shown in FIG. 6, the warning-information generating unit 142 specifies a saw blade portion of the table saw as a place corresponding to the place (a1). Consequently, by specifying the acute angle parts, the catching parts, and the roll-in parts using the image recognition and the method of pattern matching, the warning-information generating unit 142 can estimate a warning point in the visual field direction of the user without requiring information concerning dangerous places individually prepared in advance.

After estimating the warning point, the warning-information generating unit 142 generates warning information concerning a shape (step S106 in FIG. 5). Specifically, the warning-information generating unit 142 arranges a predetermined image near the place specified in step S104 to thereby generate warning information concerning a shape.

Figure 7A:
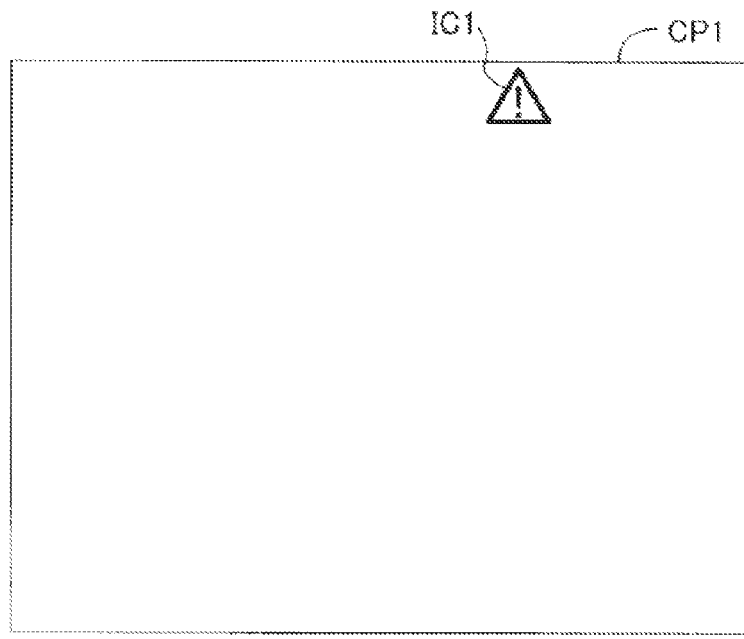
FIGS. 7A and 7B are explanatory diagrams showing examples of warning information concerning a shape.
Figure 7B:
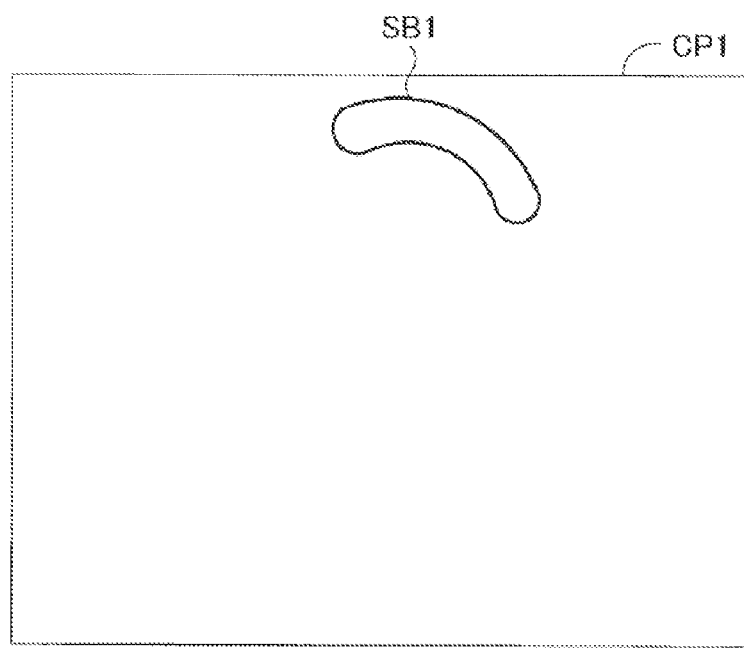

FIGS. 7A and 7B are explanatory diagrams showing examples of warning information CP1 concerning a shape. FIG. 7A shows a first example of the warning information CP1. In the warning information CP1 shown in FIG. 7A, an icon image IC1 formed by a combination of a character "!" that reminds the user of a warning and a triangle for emphasizing that the icon image IC1 is an icon is arranged near the place (i.e., the saw blade portion of the table saw) specified in step S104. When a plurality of places are specified in step S104, the icon image IC1 is arranged in each of the plurality of places. The icon image IC1 shown in FIG. 7A is only an example. As an image arranged in the warning information CP1, any image may be adopted as long as the image is an image formed by a character, a pattern, or a figure that reminds the user of a warning or a combination of the character, the pattern, and the figure. For example, characters such as "warning" or "danger" may be used or a figure such as an arrow may be used. Further, for example, display conforming to recommendation of a predetermined organization or standard such as the Association for Electric Home Appliance (AEHA) or the Globally Harmonized System of Classification and Labeling of Chemicals (GHS) may be performed. Consequently, the warning-information generating unit 142 can generate warning information capable of clearly informing the user that the user should be careful.

FIG. 7B shows a second example of the warning information CP1. In the warning information CP1 shown in FIG. 7B, a figure SB1 having an elliptical shape curved to correspond to the shape of the saw blade of the table saw is arranged to be superimposed on the place (i.e., the saw blade portion of the table saw) specified in step S104. When a plurality of places are specified in step S104, the figure SB1 having a shape corresponding to each of the plurality of places is arranged in the place. The figure SB1 shown in FIG. 7B is only an example. As the image arranged in the warning information CP1, any image may be adopted as long as the image is an image formed by a figure having a shape corresponding to the shape of the place specified in step S104. For example, the inside of a frame of the figure SB1 may be colored in order to further call the user's attention. The figure SB1 may be arranged near the place specified in step S104 rather than being superimposed on the place. Consequently, the warning-information generating unit 142 can generate warning information capable of clearly informing the user of a place where the user should be careful.

After generating the warning information concerning a shape, in step S108 in FIG. 5, the warning-information generating unit 142 acquires a temperature distribution image from the thermography 62. Specifically, the warning-information generating unit 142 starts the thermography 62, instructs the thermography 62 to perform image pickup, and acquires a temperature distribution image picked up by the thermography 62.

After acquiring the temperature distribution image, the warning-information generating unit 142 analyzes the temperature distribution image to thereby estimate a warning point in the viewing direction of the user (step S110). In step S110, specifically, places described below are regarded as "the dangerous place or the place where a danger is predicted".

(b1) A high-temperature part where temperature is equal to or higher than a first threshold in the temperature distribution image. The first threshold can be arbitrarily set. For example, the first threshold can be set to temperature at which a person is likely to get burned if the person touches the part.

(b2) A low-temperature part where temperature is equal to or lower than a second threshold in the temperature distribution image. The second threshold can be arbitrarily set. For example, the second threshold can be set to temperature at which skin tissues of a person are likely to undergo necrosis if the person touches the part.

In the workshop where the table saw is set as shown in FIG. 6, the warning-information generating unit 142 specifies a motor portion of the table saw as a place corresponding to the place (b1). Consequently, by using the temperature distribution image and the first and second thresholds concerning temperature, the warning-information generating unit 142 can estimate a warning point in the visual field direction of the user without requiring information concerning dangerous places individually prepared in advance.

After estimating the warning point, the warning-information generating unit 142 generates warning information concerning temperature (step S112 in FIG. 5). Specifically, the warning-information generating unit 142 arranges a predetermined image near the place specified in step S110 to thereby generate warning information concerning temperature.

Figure 8A:
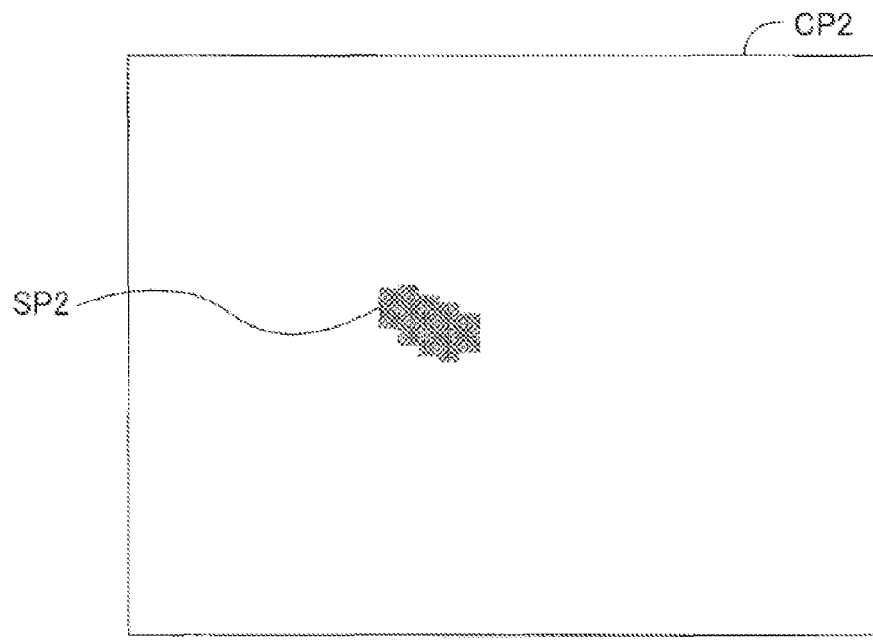
FIGS. 8A and 8B are explanatory diagrams showing examples of warning information concerning temperature.
Figure 8B:
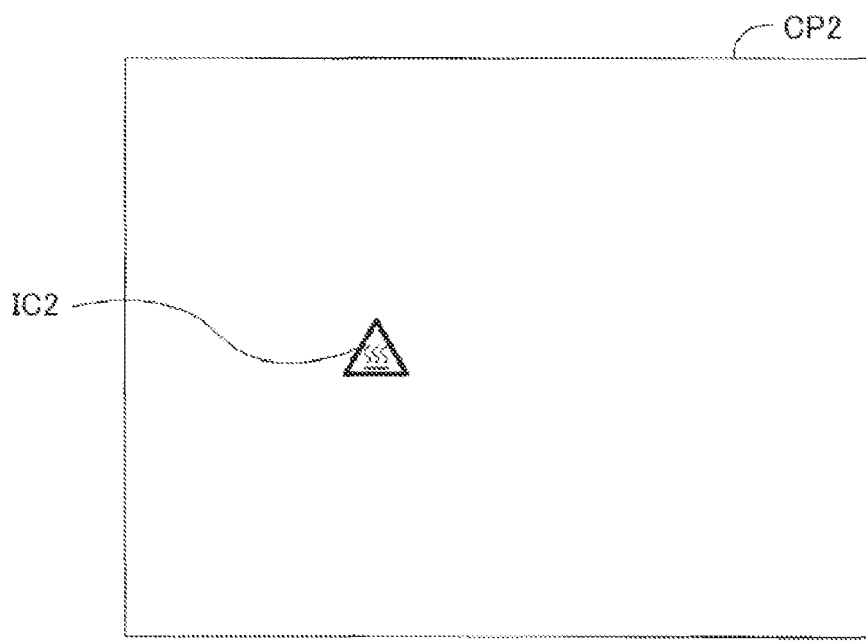
Figure 9:
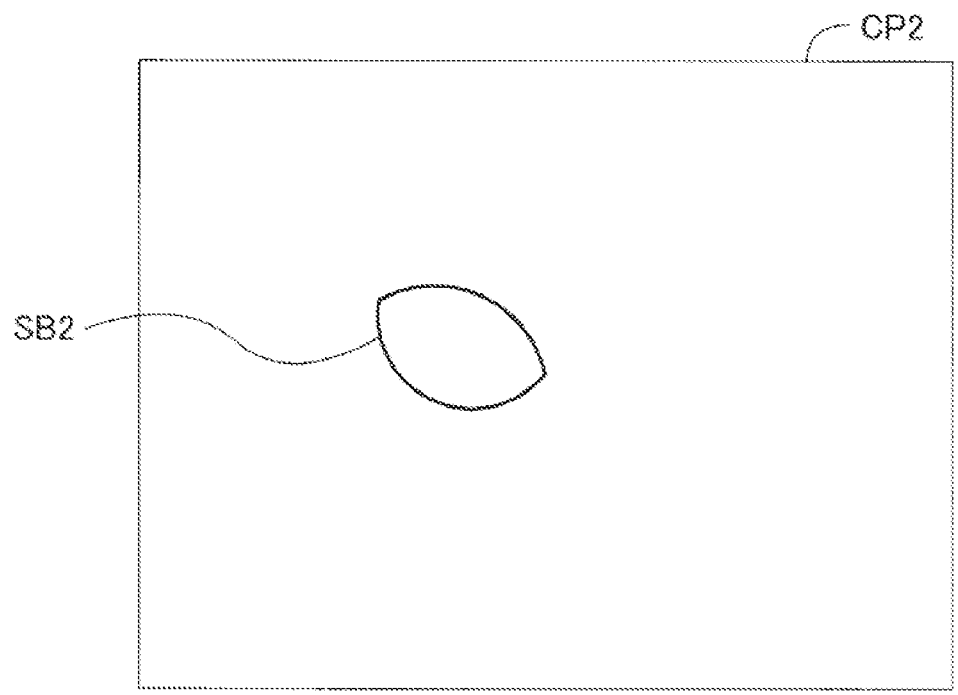
FIG. 9 is an explanatory diagram showing an example of warning information concerning temperature.

FIGS. 8A and 8B and FIG. 9 are explanatory diagrams showing examples of warning information CP2 concerning temperature. FIG. 8A shows a first example of the warning information CP2. In the warning information CP2 shown in FIG. 8A, an extracted image SP2 obtained by extracting a portion where temperature is equal to or higher than the first threshold from the temperature distribution image is arranged to be superimposed on the place (i.e., the motor portion of the table saw) specified in step S110. When a place corresponding to the place (b2) is specified in step S110, as the extracted image SP2, an image obtained by extracting a portion where temperature is equal to or lower than the second threshold from the temperature distribution image is used. When places corresponding to both the places (b1) and (b2) are specified in step S110, as the extracted image SP2, an image obtained by extracting both of the portion where temperature is equal to or higher than the first threshold and the portion where temperature is equal to or lower than the second threshold from the temperature distribution image is used. A figure SB2 may be arranged near the place specified in step S110 rather than being superimposed on the place. Consequently, the warning-information generating unit 142 can generate warning information capable of clearly informing the user of a temperature distribution and a temperature change in a place where the user should be careful. The extracted image SP2 is the image obtained by extracting the place where temperature exceeds the first or second threshold (in the case of the second threshold, the place where temperature exceeds a lower limit) from the temperature distribution image. Therefore, compared with the case in which the temperature distribution image is directly used as warning information, it is possible to generate warning information that can call the user's attention in a form that does not excessively block the visual field of the user.

FIG. 8B shows a second example of the warning information CP2. In the warning information CP2 shown in FIG. 8B, an icon image IC2 formed by a combination of a mark that reminds the user of a warning of heat alert and a triangle for emphasizing that the icon image IC2 is an icon is arranged near the place (i.e., the motor portion of the table saw) specified in step S110. When a plurality of places are specified in step S110, the icon image IC2 is arranged for each of the plurality of places. The icon image IC2 shown in FIG. 8B is only an example. As an image arranged in the warning information CP2, any image may be adopted as long as the image is an image formed by a character, a pattern, or a figure that reminds the user of a warning or a combination of the character, the pattern, and the figure. Further, display conforming to recommendation of a predetermined organization or standard may be performed. Details are the same as the details explained with reference to FIG. 7A.

FIG. 9 shows a third example of the warning information CP2. In the warning information CP2 shown in FIG. 9, a figure SB2 having a substantially elliptical shape corresponding to the shape of a motor of the table saw is arranged to be superimposed on the place (i.e., the motor portion of the table saw) specified in step S110. When a plurality of places are specified in step S110, the figure SB2 having a shape corresponding to each of the places is arranged in the place. The figure SB2 shown in FIG. 9 is only an example. As an image arranged in the warning information CP2, any image may be adopted as long as the image is an image formed by a figure having a shape corresponding to the shape of the place specified in step S110. Details are the same as the details explained with reference to FIG. 7B. The figure SB2 may be arranged near the place specified in step S110 rather than being superimposed on the place.

Figure 10A:
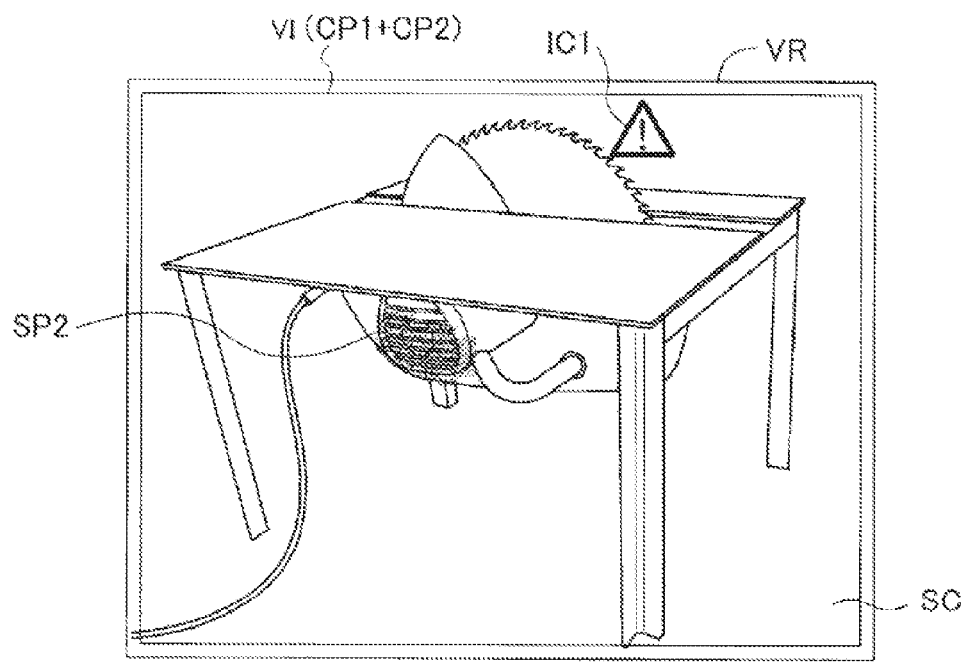
FIGS. 10A and 10B are explanatory diagrams showing examples of an image visually recognizable by the user.
Figure 10B:
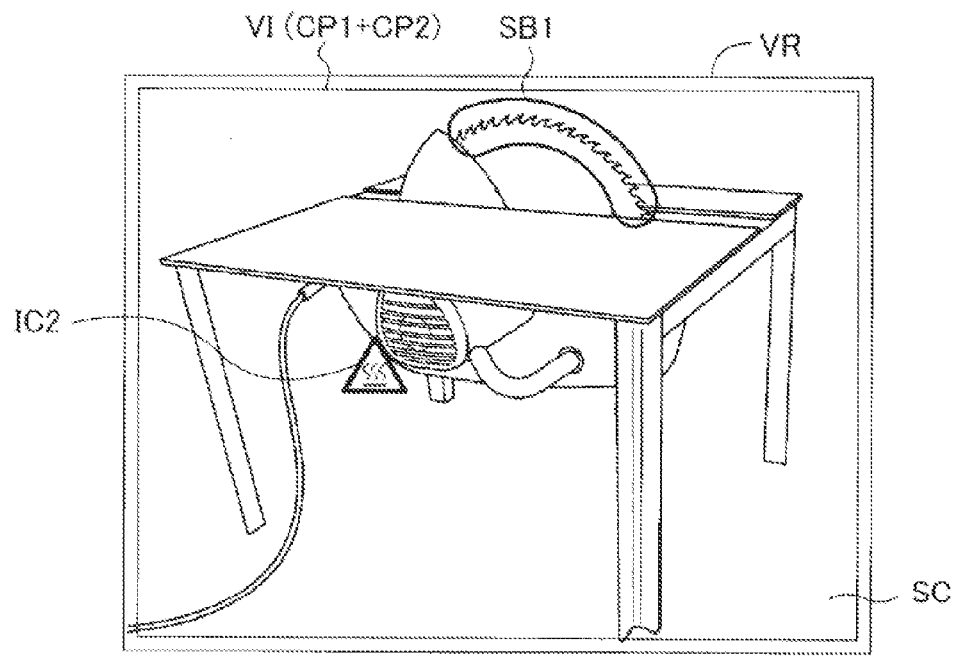

After generating the warning information concerning temperature, in step S114 in FIG. 5, the warning-information generating unit 142 displays the warning information. Specifically, the warning-information generating unit 142 transmits the warning information CP1 concerning a shape and the warning information CP2 concerning temperature to the image processing unit 160. The image processing unit 160, which receives the warning information CP1 and CP2, generates a combined image including the warning information CP1 and CP2 as layers and executes the display processing explained with reference to FIG. 2 on the generated combined image. As a result, as shown in FIGS. 10A and 10B, the warning information CP1 and CP2 is displayed as the virtual image VI in the visual field VR of the user of the head mounted display 100. The head mounted display 100 in this embodiment is an optically transmissive head mounted display for enabling the user to visually recognize an outside scene simultaneously with visually recognizing a virtual image. Therefore, the user of the head mounted display 100 can visually recognize, in a superimposed state, the workshop in the outside scene SC seen through the right optical-image display unit 26 and the left optical-image display unit 28 and the warning information CP1 and CP2 seen as the virtual image VI.

FIGS. 10A and 10B are explanatory diagrams showing examples of an image visually recognizable by the user. FIG. 10A shows a first example of the image visually recognizable by the user. In the first example, the icon image IC1 for calling the user's attention is arranged near the place (i.e., the saw blade portion of the table saw) specified in step S104 of the attention calling process. In the first example, further, the extracted image SP2 for calling the user's attention is arranged to be superimposed on the place (i.e., the motor portion of the table saw) specified in step S110 of the attention calling step. FIG. 10B shows a second example of the image visually recognizable by the user. In the second example, the figure SB1 for calling the user's attention is arranged to be superimposed on the place (i.e., the saw blade portion of the table saw) specified in step S104. In the second example, further, the icon image IC2 for calling the user's attention is arranged near the place (i.e., the motor portion of the table saw) specified in step S110.

Only one of the "generation processing for the warning information CP1 concerning a shape" shown in steps S102 to S106 and the "generation processing for the warning information CP2 concerning temperature" shown in steps S108 to S112 of the attention calling process may be executed.

As explained above, in the attention calling process (FIG. 5) in the first embodiment, the warning-information generating unit 142 generates the warning information CP1 and CP2 on the basis of the image in the visual field direction of the user (FIG. 6). The image display unit 20 causes the user to visually recognize the generated warning information CP1 and CP2 as a virtual image. The warning-information generating unit 142 estimates a warning point in the visual field direction of the user according to the image recognition of an outside scene image or the image analysis of a temperature distribution image. Therefore, it is possible to realize the head mounted display 100 (the head-mounted display device) capable of estimating a warning point such as a danger in the visual field direction of the user and calling the user's attention without requiring information concerning dangerous places individually prepared in advance.

Further, the warning-information generating unit 142 generates the warning information CP1 and CP2 in which the predetermined image (e.g., the icon image IC1, the figure SB1, the extracted image SP2, the icon image IC2, the figure SB2, etc.) is arranged near a place where the user needs to be careful. Therefore, the head mounted display 100 (the head-mounted display device) can call the user's attention in a form that does not excessively block the visual field of the user. The predetermined image (e.g., the icon image IC1, the figure SB1, the extracted image SP2, the icon image IC2, the figure SB2, etc.) is arranged near a place where the user needs to be careful. Therefore, it is possible to clearly inform the user of the place where the user should be careful.

A-3. Additional Processing in the Attention Calling Processing

In the attention calling processing (FIG. 5), additional processing 1 to 3 explained below may be further performed. The additional processing 1 to 3 may be independently added or may be added in combination.

A-3-1. Additional Processing 1

In the additional processing 1, calibration of the display area of a virtual image and the acquisition area of the image acquiring unit (the camera 61 or the thermography 62) is performed. The warning-information generating unit 142 performs processing explained in A to G below prior to the attention calling processing (FIG. 5).

(A) Image data of a guide image for the calibration (hereinafter referred to as "guide image data" as well) is stored in the storing unit 120 in advance. The guide image is an image for indicating an end portion of a display area of a virtual image to the user of the head mounted display 100. For example, the guide image is an image formed in a rectangular shape, which has an aspect ratio same as the aspect ratio of the right LCD 241 and the left LCD 242, and having an entirely white background. The guide image can be an image having circular guide marks in the four corners of the guide image and a portion located in the intersection of diagonals.

(B) The warning-information generating unit 142 reads out the guide image data stored in the storing unit 120 and transmits the guide image data to the image processing unit 160. The image processing unit 160, which receives the guide image data, executes the processing explained with reference to FIG. 2. As a result, a guide image is displayed in the visual field VR of the user of the head mounted display 100 as the virtual image VI.

(C) The warning-information generating unit 142 guides the user to point the guide marks of the guide image displayed as the virtual image VI in order. As a method of guidance for the user, a message including a dialog box or the like may be used or guidance by sound may be performed. The guidance by sound is preferable because it is possible to guide the user without blocking the guide image being displayed.

(D) The warning-information generating unit 142 causes the camera 61 to pick up an outside scene image.

(E) The warning-information generating unit 142 recognizes the outside scene image picked up by the camera 61 and specifies the position of the fingertip of the user. The warning-information generating unit 142 acquires coordinates of fingertip positions concerning the guide marks and stores the coordinates in the storing unit 120. For example, the coordinates of the fingertip positions can be defined as movement amounts in the X direction and the Y direction from a coordinate (0, 0) of a pixel in the uppermost left portion of the outside scene image.

(F) The warning-information generating unit 142 repeats, concerning all the guide marks, a series of processing of the acquisition of an outside scene image, the acquisition of a coordinate of the fingertip position, and the storage of the coordinate. Thereafter, the warning-information generating unit 142 ends the display of the guide image. In this way, the warning-information generating unit 142 acquires in advance an area where the image pickup area of the camera 61 and the display area of the virtual image VI overlap each other. The area where the image pickup area (the acquisition area) of the camera 61 and the display area of the virtual image VI overlap each other is referred to as "overlapping area" as well.

(G) In step S104 of the attention calling processing (FIG. 5), the warning-information generating unit 142 recognizes an image in the overlapping area in the outside scene image picked up by the camera 61. In step S106, the warning-information generating unit 142 generates the warning information CP1 corresponding to the overlapping area. Similarly, in step S110 of the attention calling processing, the warning-information generating unit 142 analyzes an image in the overlapping area in the temperature distribution image picked up by the thermography 62. In step S112, the warning-information generating unit 142 generates the warning information CP2 corresponding to the overlapping area.

The procedure for performing the calibration only with the camera 61 is explained above on the premise that the image acquisition area of the camera 61 and the image acquisition area of the thermography 62 are the same. However, when the image acquisition area of the camera 61 and the image acquisition area of the thermography 62 are different, processing same as the processing explained above can be performed concerning the thermography 62.

Consequently, the warning-information generating unit 142 can generate the warning information CP1 and CP2 for the overlapping area where the display area of the virtual image VI and the acquisition area of the camera 61 and the thermography 62 (the image acquiring unit) overlap each other. Therefore, it is possible to reduce the occurrence of "a shift between an image directly viewed by the user in the visual field of the user and the virtual image VI that the user is caused to visually recognize by the image display unit 20", which is the problem that occurs in the transmissive head mounted display 100 (the head-mounted display device). As a result, it is possible to reduce a sense of discomfort given to the user when the user is caused to visually recognize the warning information CP1 and CP2 as the virtual image.

A-3-2. Additional Processing 2

In the additional processing 2, attention of the user of the head mounted display 100 is called using sound. In the attention calling processing (FIG. 5), the warning-information generating unit 142 performs processing explained in H to J below.

(H) In step S106 of the attention calling processing (FIG. 5), the warning-information generating unit 142 generates sound data for attention calling in addition to the generation of the warning information CP1. It is preferable that the sound data is changed according to types a1 to a3 of the place specified in step S104. For example, when a place corresponding to the place (a2) is specified in step S104, the warning-information generating unit 142 generates sound data such as "There is a place where the body or clothes are likely to be caught. Please be careful."

(I) In step S112 of the attention calling processing, the warning-information generating unit 142 generates sound data for attention calling in addition to the generation of the warning information CP2. It is preferable that the sound data is changed according to types b1 and b2 of the place specified in step S110. For example, when a place corresponding to the place (b1) is specified in step S110, the warning-information generating unit 142 generates sound data such as "There is a high-temperature place. Please be careful not to get burned."

(J) In step S114 of the attention calling processing, the warning-information generating unit 142 transmits the sound data generated by the processing H and I to the sound processing unit 170 in addition to the warning information. The sound processing unit 170, which receives the sound data, supplies sound signals to the speaker (a sounding body) of the right earphone 32 and the speaker (a sounding body) of the left earphone 34 on the basis of the acquired sound data.

Consequently, the warning-information generating unit 142 can further call attention of the user of the head mounted display 100 through sound.

A-3-3. Additional Processing 3

In the additional processing 3, attention of the user of the head mounted display 100 is called using stimulation through a tactile sense. In order to realize the additional processing 3, the head mounted display 100 shown in FIG. 1 includes a pressurizing unit and a vibrating motor on the inner sides of the right holding unit 21 and the left holding unit 23, in other words, sides opposed to the head of the user when the user wears the head mounted display 100 and in positions corresponding to the temporal regions of the user when the user wears the head mounted display 100.

The pressurizing unit includes the air in a stretchable outer side member. The pressurizing unit can increase or reduce the volume of the pressurizing unit by increasing or reducing an amount of the included air. In a state in which the head mounted display 100 is mounted on the head of the user, it is possible to apply pressure to the head of the user, in other words, apply stimulation through a tactile sense to the user by increasing the volume of the pressurizing unit. It is preferable that the outer side member of the pressurizing unit is formed of a pleasant feel material such as rubber or polyurethane. Then, it is possible to improve a sense of wearing of the head mounted display 100.

In the vibrating motor, a weight for eccentric rotation is provided in a shaft of a motor. It is possible to generate vibration during actuation. In a state in which the head mounted display 100 is mounted on the head of the user, the vibrating motor actuates the motor, whereby it is possible to apply vibration to the head of the user, in other words, apply stimulation through a tactile sense to the user. The pressurizing unit and the vibrating motor are collectively referred to as "tactile stimulation unit" as well.

In step S114 of the attention calling processing, the warning-information generating unit 142 actuates the pressurizing unit and the vibrating motor in addition to the transmission of the warning information. At this point, the warning-information generating unit 142 may change a driving level (pressurizing strength) of the pressurizing unit and a driving level (vibration strength and a vibration period) of the vibrating motor according to the places specified in step S104 and step S110.

Consequently, the warning-information generating unit 142 can further call attention of the user of the head mounted display 100 using the stimulation through a tactile sense.

B. Second Embodiment

In a second embodiment of the invention, a configuration capable of supporting work performed by a user and informing the user of a warning point such as a danger incidental to the work in a head-mounted display device is explained. In the following explanation, only portions having configurations and operations different from the configurations and the operations in the first embodiment are explained. In the figures, components same as the components in the first embodiment are denoted by reference numerals and signs same as the reference numerals and signs in the first embodiment explained above. Detailed explanation of the components is omitted.

B-1. Configuration of the Head-Mounted Display Device

Figure 11:
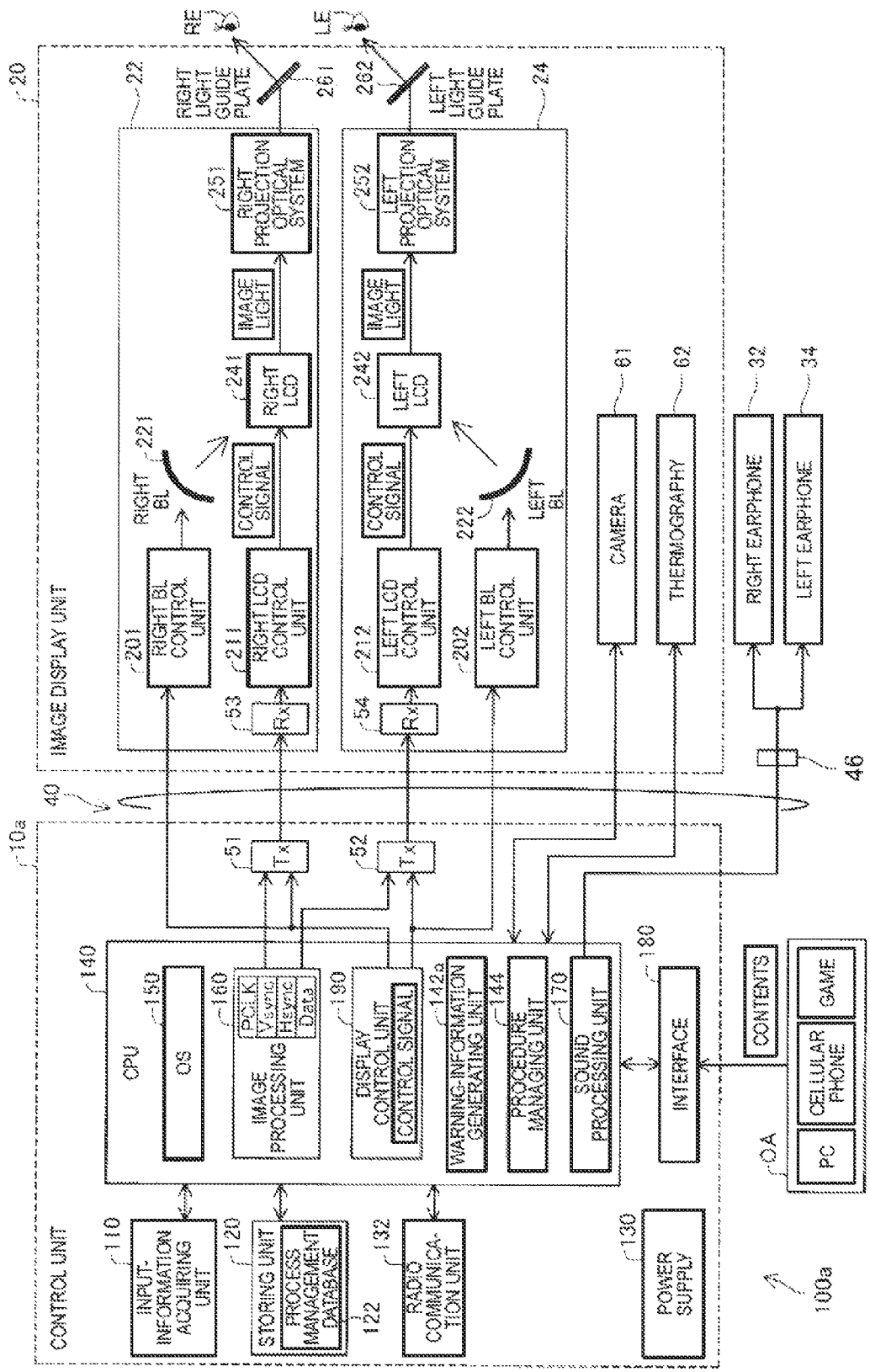
FIG. 11 is a block diagram functionally showing the configuration of a head mounted display in a second embodiment.

FIG. 11 is a block diagram functionally showing the configuration of a head mounted display 100a in the second embodiment. A difference from the first embodiment shown in FIG. 2 is that the head mounted display 100a includes a control unit 10a instead of the control unit 10. The control unit 10a includes a warning-information generating unit 142a instead of the warning-information generating unit 142 and further includes a procedure managing unit 144 and a procedure management table 122. The warning-information generating unit 142a and the procedure managing unit 144 execute procedure management processing by cooperating with each other.

FIG. 12 is an explanatory diagram showing an example of the procedure management table 122. The procedure management table 122 is a table used in procedure management processing explained below. The procedure management table 122 is stored in the storing unit 120 in advance. The procedure management table 122 includes fields of a work number, a procedure number, a procedure name, instruction content, a near miss case, an accident case, and limitation.

In the work number, an identifier for uniquely identifying work is stored. The identifier consists of a character string and can be combined with, for example, an alphanumeric character. In the fields following the procedure number, various kinds of information concerning a plurality of procedures included in work specified by the work number are stored.

In the procedure number, an identifier for uniquely identifying a procedure is stored. The identifier consists of a character string and can be combined with, for example, an alphanumeric character. In the example shown in FIG. 12, it is assumed that the plurality of procedures in the work are advanced in the ascending order of procedure numbers. In the procedure name, a name of the procedure is stored. In the instruction content, information representing content that the user should carry out in the procedure is stored. In the example shown in FIG. 12, the instruction content is expressed by a sentence of a guidance sentence format for the user. However, a sentence format of the instruction content can be arbitrarily set. The instruction content is not limited to the sentence and may be expressed by a photograph or a drawing (an assembly diagram, a layout plan, a circuit diagram, etc.) or may be expressed by combining the sentence, the photograph, and the drawing.

In the near miss case, presence or absence of a near miss case that occurred in the past in the procedure is stored. A near miss means finding of a case that does not lead to an accident but is nearly an accident, in other words, could naturally lead to an accident. In the accident case, presence or absence of an accident case that occurred in the past in the procedure. The accident includes a disaster. In the limitation, information representing a matter that the warning-information generating unit 142a should check between the procedure and transition to the next procedure. Details are explained below.

In the example shown in FIG. 12, for example, it is seen that twenty-seven procedures identified by procedure numbers 1 to 27 are included in work identified by a work number 1. It is seen that content that the user should carry out in a procedure identified by the procedure number 1 is "preparation of a timber". It is seen that, in the procedure identified by the procedure number 1, there is neither a near miss case nor an accident case in the past. Further, it is seen that there is no matter that the warning-information generating unit 142a should check between the procedure identified by the procedure number 1 and transition to the next procedure, that is, a procedure identified by the procedure number 2. In this way, the procedure management table 122 associates a procedure, content that the user should carry out in the procedure, and information concerning an accident or a near miss in the past in the procedure.

B-2. Procedure Management Processing

Figure 13:
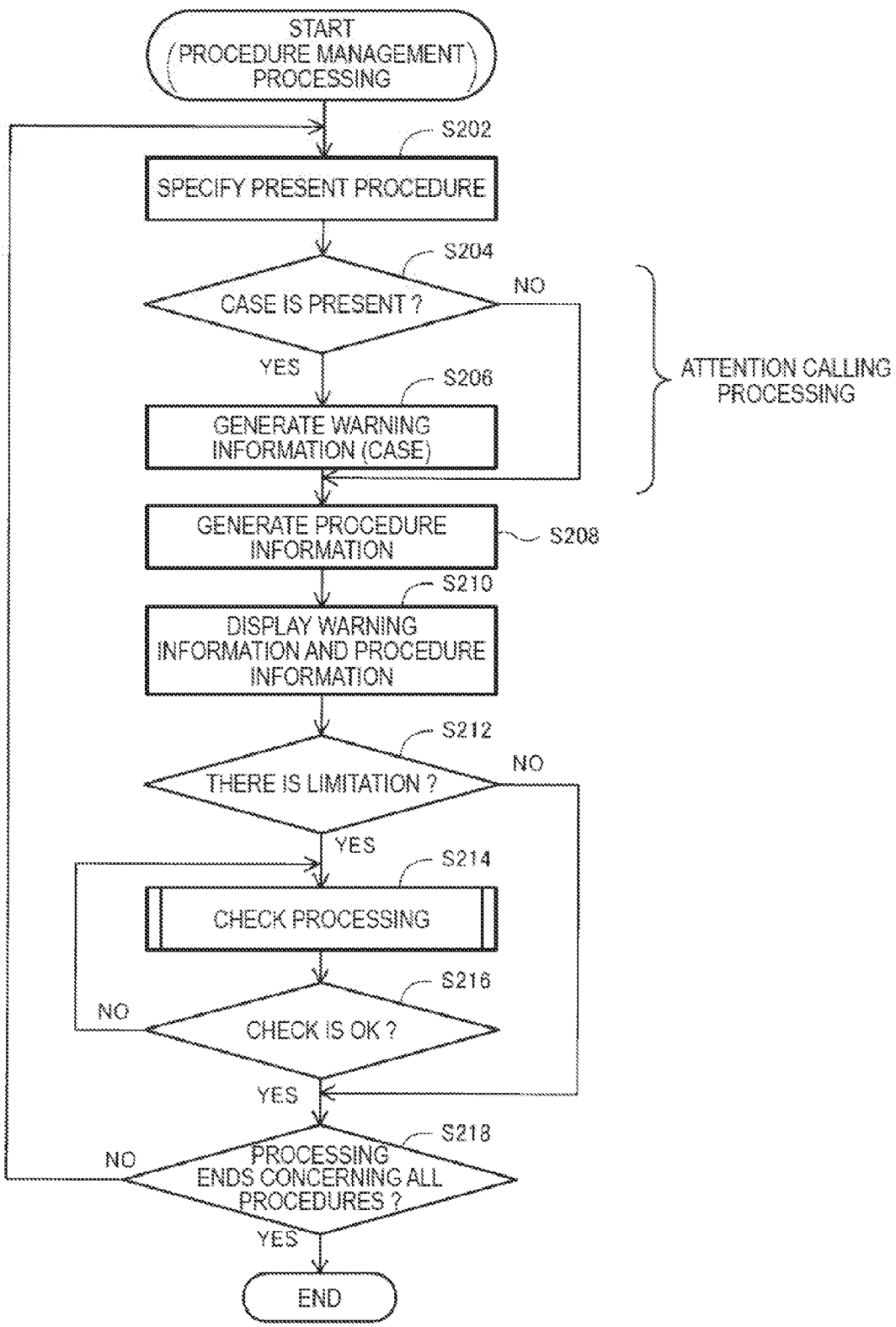
FIG. 13 is a flowchart for explaining a procedure of procedure management processing in the second embodiment.

FIG. 13 is a flowchart for explaining a procedure of procedure management processing in the second embodiment. In the second embodiment, procedure management processing shown in FIG. 13 is executed instead of the attention calling processing explained with reference to FIG. 5. The procedure management processing is processing for supporting work performed by the user and informing the user of a warning point such as a danger incidental to the work. A start trigger of the procedure management processing can be arbitrarily set. For example, the start of the head mounted display 100a may be set as the start trigger or a processing start request from the OS 150 or a specific application may be set as the start trigger. When the procedure management processing is invoked from the specific application and executed, the procedure management processing operates as a subroutine of the specific application.

The procedure managing unit 144 specifies the present procedure (step S202). Specifically, the procedure managing unit 144 starts the camera 61, instructs the camera 61 to perform image pickup, and acquires an outside scene image picked up by the camera 61. The procedure managing unit 144 recognizes the acquired outside scene image to thereby specify the present procedure out of the plurality of procedures stored in the procedure management table 122. Consequently, the procedure managing unit 144 can automatically specify the present procedure on the basis of an image in the visual field direction of the user (the outside scene image) acquired by the camera 61 (the image acquiring unit).

The warning-information generating unit 142a determines whether a case is present concerning the present procedure (step S204). Specifically, the warning-information generating unit 142a refers to an entry indicating the present procedure of the procedure management table 122. When at least one of a value of the field of the near miss case and a value of the field of the accident case is "Yes", the warning-information generating unit 142a determines that a case is present. In other cases, the warning-information generating unit 142a determines that a case is absent. When determining that a case is absent (NO in step S204), the warning-information generating unit 142a transitions the processing to step S208.

When determining that a case is present (YES in step S204), the warning-information generating unit 142a generates warning information concerning the case (step S206). Specifically, the warning-information generating unit 142a refers to the procedure management table 122 and generates warning information concerning the case using the presence or absence of the near miss case and the accident case associated with the present procedure.

Figure 14A:
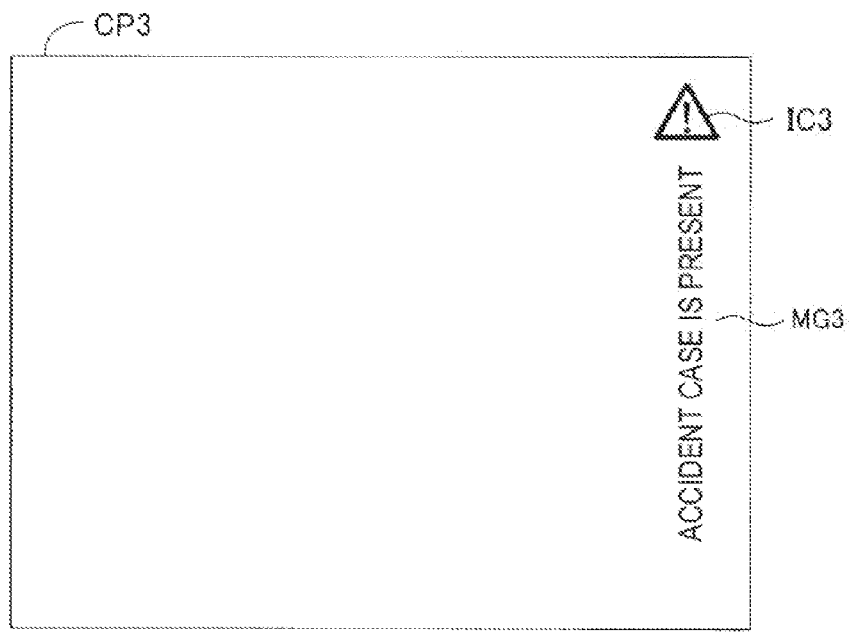
FIGS. 14A and 14B are explanatory diagrams showing examples of warning information concerning a case.
Figure 14B:
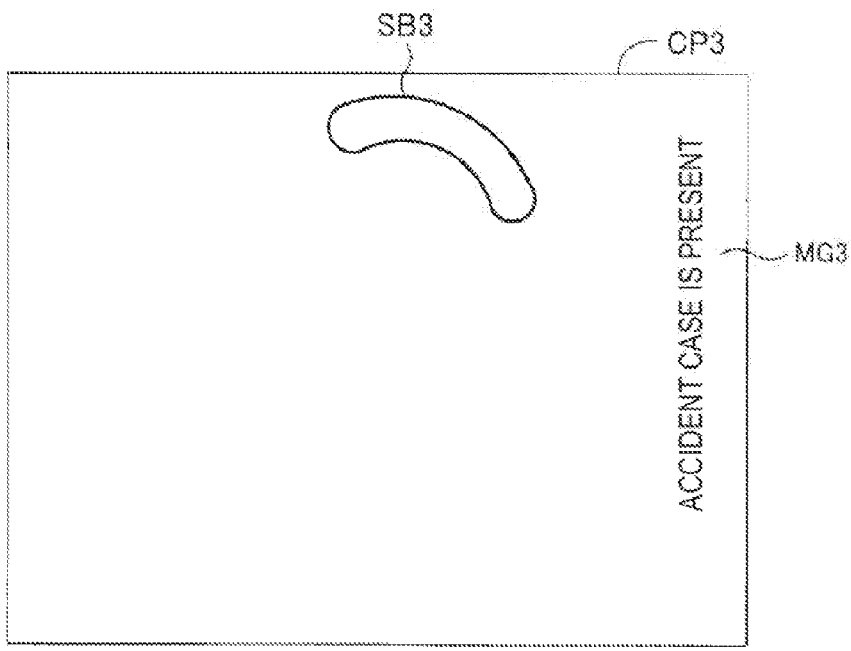

FIGS. 14A and 14B are explanatory diagrams showing examples of warning information CP3 concerning a case. FIGS. 14A and 14B show a first example of the warning information CP3. In the warning information CP3 in FIG. 14A, an icon image IC3 formed by a combination of a character "!" that reminds the user of a warning and a triangle for emphasizing that the icon image IC3 is an icon is arranged at an end portion on the upper right side. The icon image IC3 shown in FIG. 14A is only an example. As the icon image IC3, any image may be adopted as long as the image is an image formed by a character, a pattern, or a figure that reminds the user of a warning or a combination of the character, the pattern, and the figure. For example, display conforming to recommendation of a predetermined organization or standard may be performed.

A message MG3 "an accident case is present", which is an image for calling the user's attention, is arranged in an end portion on the right side of the warning information CP3 and below the icon image IC3. As the message MG3, any image may be adopted as long as the image is an image indicating that the user's attention is called. However, it is preferable to adopt different images when it is determined in step S204 that a near miss case is present and when it is determined in step S204 that an accident case is present. Then, the warning-information generating unit 142a can generate different kinds of the warning information CP3 when an accident occurred in the past and when a near miss occurred in the past in the present procedure. Therefore, the user can learn whether a case that occurred in the past in the present procedure is an accident or a near miss.

FIG. 14B shows a second example of the warning information CP3. When the second example is adopted, in the procedure management table 122 (FIG. 12), a place (a coordinate) where a figure SB3 is arranged and the shape of the figure SB3 are further stored in advance. The place where the figure SB3 is arranged is preferably set near a place where an accident or a near miss occurred in the past. In the warning information CP3 shown in FIG. 14B, the figure SB3 having the shape stored in the procedure management table 122 is arranged in the coordinate stored in the procedure management table 122. When a plurality of pairs of coordinates and shapes are stored in the procedure management table 122, the image SB3 having a shape corresponding to each of the plurality of coordinates is arranged with respect to the coordinate. The message MG3 "an accident case is present", which is an image for calling the user's attention, is arranged in an end portion on the right side. The message MG3 is the same as the message MG3 shown in FIG. 14A.

In the warning information CP3 explained with reference to FIGS. 14A and 14B, modifications explained below are possible.

(i) The arrangements of the icon image IC3, the image SB3, and the message MG3 can be arbitrarily changed. However, in order to call the user's attention in a form that does not excessively block the visual field of the user, it is preferable that the icon image IC3 and the message MG3 are arranged in end portions (in other words, near any ones of the four sides) of the warning information CP3.

(ii) The warning-information generating unit 142a may generate a different kind of the warning information CP3 according to characteristics of the user. The characteristics of the user include at least any one of age, sex, physique, and proficiency in work. For example, the warning-information generating unit 142a may change the sizes of the icon image IC3, the image SB3, and the message MG3 according to the age of the user. For example, the warning-information generating unit 142a may arrange the icon image IC3 and the message MG3 in the warning information CP3 when the proficiency in work of the user is low and arrange only the message MG3 in the warning information CP3 when the proficiency in work of the user is high. The characteristics of the user may be acquired and stored in the storing unit 120 in advance or may be acquired every time before the procedure management processing is started. Consequently, the warning-information generating unit 142a can perform fine generation of the warning information CP3 corresponding to the characteristics of the user.

After generating the warning information concerning a case, in step S208 in FIG. 13, the procedure managing unit 144 generates procedure information. Specifically, the procedure managing unit 144 refers to the procedure management table 122 and generates procedure information using instruction content associated with the present procedure.

Figure 15A:
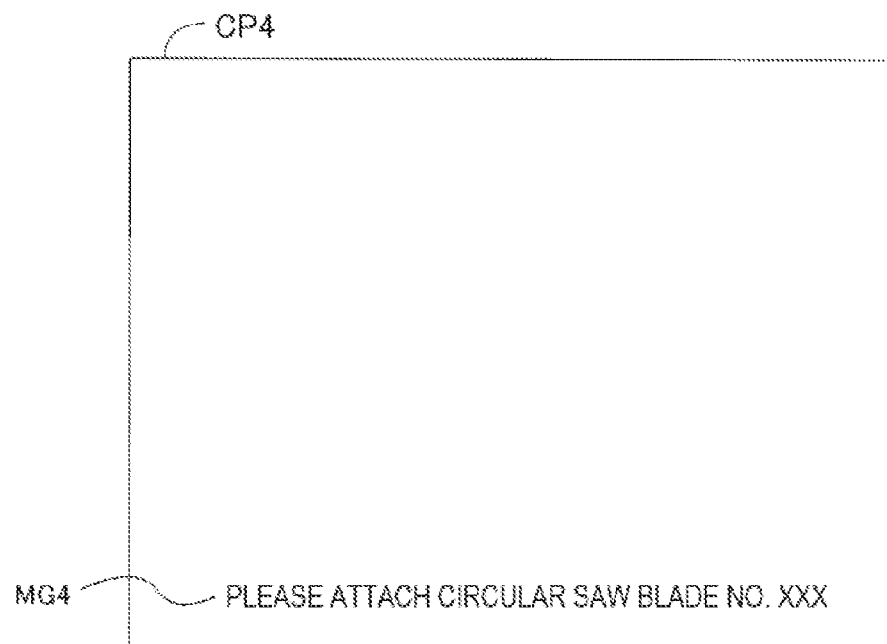
FIGS. 15A and 15B are explanatory diagrams showing examples of procedure information.
Figure 15B:
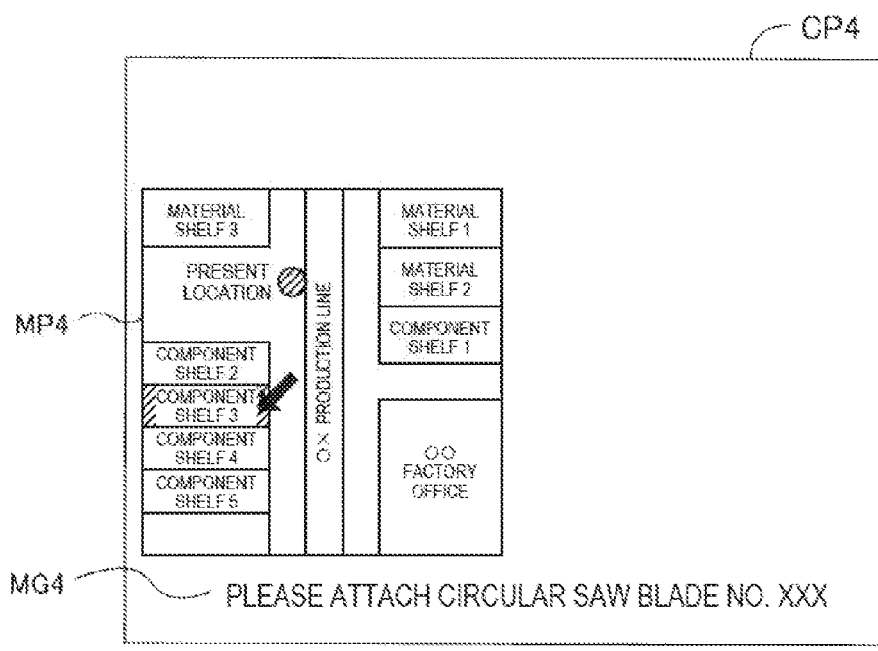

FIGS. 15A and 15B are explanatory diagrams showing examples of procedure information CP4. FIG. 15A shows a first example of the procedure information CP4. In the procedure information CP4 shown in FIG. 15A, a message MG4 "Please attach a circular saw blade No. XXX", which is an image representing content that the user should carry out, is arranged in an end portion on the lower side. The message MG4 is a value of the instruction content field associated with the present procedure in the procedure management table 122. The arrangement of the message MG4 can be arbitrarily changed. However, in order to inform the user of the content, which the user should carry out, in a form that does not excessively block the visual field of the user, it is preferable that the message MG4 is arranged in an end portion (in other words, near any one of the four sides) of the procedure information CP4.

FIG. 15B shows a second example of the procedure information CP4. In the procedure information CP4 shown in FIG. 15B, the message MG4 "Please attach a circular saw blade No. XXX", which is an image representing content that the user should carry out, is arranged in an end portion on the lower side. The message MG4 is the same as the message MG4 shown in FIG. 15A.

In an end portion on the lower left side of the procedure information CP4 and above the message MG4, a map MP4 plotted with the present location of the user and the position of the "circular saw blade No. XXX", which is a tool included in the message MG4, is arranged. The present location of the user may be estimated from a relation between a layout in a workshop and the present procedure stored in the storing unit 120 in advance. Alternatively, a present-position acquiring unit such as a GPS (Global Positioning System) may be mounted on the head mounted display 100a to calculate the present location of the user according to a positioning value of the GPS. The map MP4 shown in FIG. 15B is only an example. Any image may be arranged as long as the image is information (an image) for assisting the user. The arrangement of the map MP4 can be arbitrarily changed. In order to inform the user of information for assisting the user in a form that does not excessively block the visual field of the user, an icon for displaying the map MP4 may be arranged in an end portion (in other words, near any one of the four sides) of the procedure information CP4.

Figure 16A:
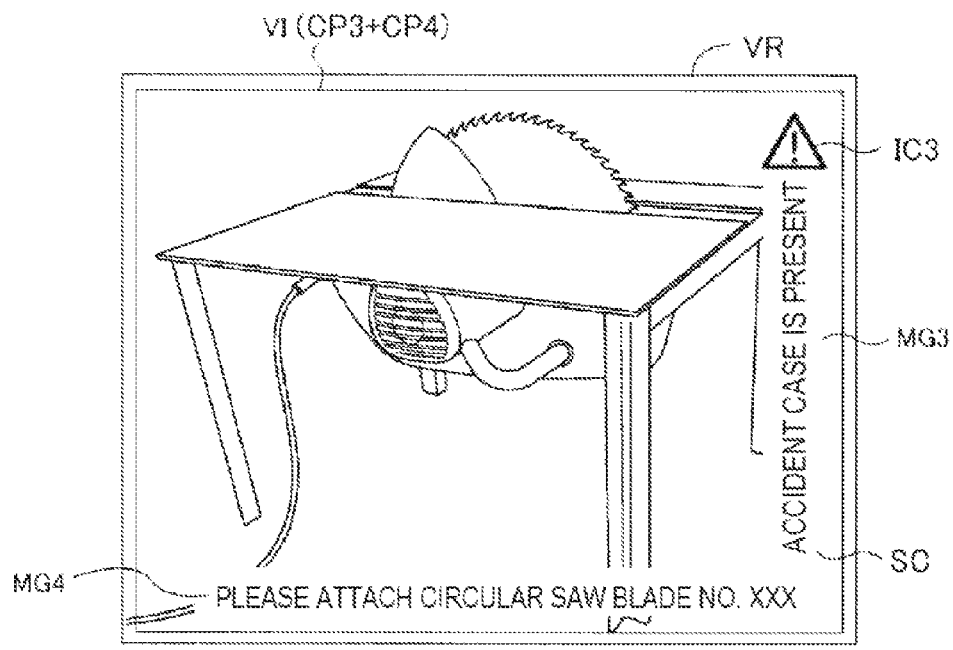
FIGS. 16A and 16B are explanatory diagrams showing examples of an image visually recognizable by a user.
Figure 16B:
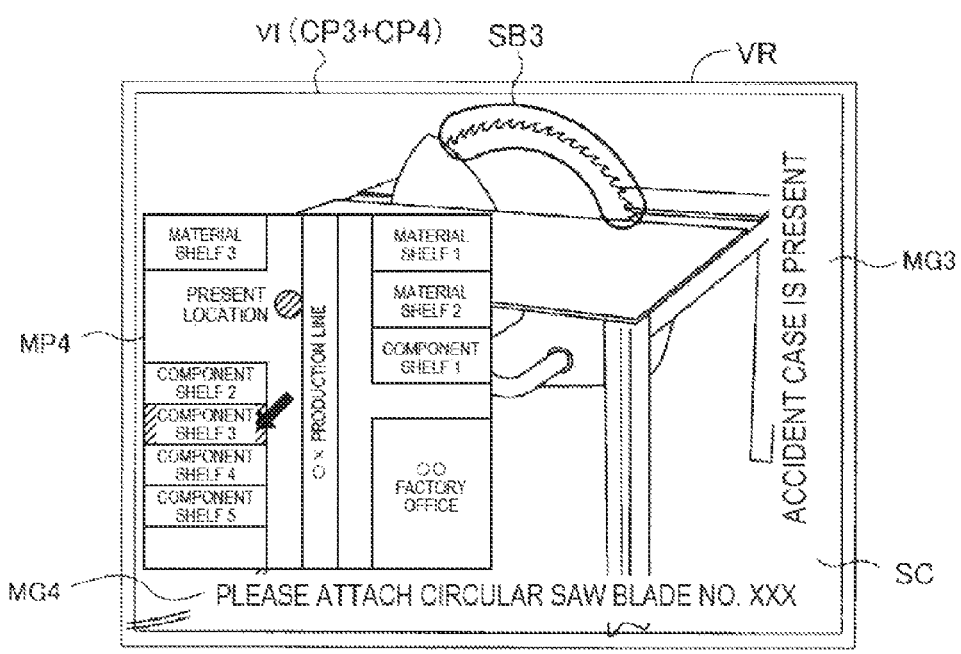

After generating the procedure information, in step S210 in FIG. 13, the warning-information generating unit 142a displays the warning information concerning a case. The procedure managing unit 144 displays the procedure information. Specifically, the warning-information generating unit 142a transmits the warning information CP3 concerning a case to the image processing unit 160. The procedure managing unit 144 transmits the procedure information CP4 to the image processing unit 160. The image processing unit 160, which receives the waning information CP3 and the procedure information CP4, generates a combined image including the warning information CP3 and the procedure information CP4 as layers and executes the display processing explained with reference to FIG. 2 on the generated combined image. As a result, as shown in FIGS. 16A and 16B, the warning information CP3 and the procedure information CP4 are displayed as the virtual image VI in the visual field VR of the user of the head mounted display 100a. The head mounted display 100a in this embodiment is an optically transmissive head-mounted display for enabling the user to visually recognize an outside scene simultaneously with visually recognizing a virtual image. Therefore, the user of the head mounted display 100a can visually recognize, in a superimposed state, the workshop in the outside scene SC seen through the right optical-image display unit 26 and the left optical-image display unit 28 and the warning information CP3 and the procedure information CP4 seen as the virtual image VI.

FIGS. 16A and 16B are explanatory diagrams showing an example of an image visually recognizable by the user. FIG. 16A shows a first example of the image visually recognizable by the user. In the first example, the icon image IC3 for calling the user's attention is arranged in an end portion on the upper right side of the virtual image VI. Similarly, the message MG3 for calling the user's attention is arranged in an end portion on the right side of the virtual image VI and below the icon image IC3. The message MG4 representing content that the user should carry out is arranged in an end portion on the lower side of the virtual image VI. FIG. 16B shows a second example of the image visually recognizable by the user. In the second example, the message MG3 for calling the user's attention is arranged in an end portion on the right side of the virtual image VI. Similarly, the message MG4 representing content that the user should carry out is arranged in an end portion on the lower side of the virtual image VI. The map MP4 for assisting the user is arranged in an end portion on the lower left side of the virtual image VI and above the message MG4. In FIGS. 16A and 16B, for convenience of illustration, an outside scene portion seen through the message MG3, the message MG4, and the map MP4 is not shown. Actually, the user can visually recognize the legs of the table saw through characters of the messages. The user can visually recognize the legs of the table saw through the map as well.

As explained above, in steps S202 to S210 of the procedure management processing (FIG. 13) in the second embodiment, the image display unit 20 causes the user to visually recognize, as the virtual image VI, both of the procedure information CP4 representing the content that the user should carry out concerning the present procedure and the warning information CP3 for calling the user's attention when warning information stored in advance is present in the procedure. Therefore, it is possible to realize the head mounted display 100a (the head-mounted display device) capable of supporting work performed by the user and informing the user of a warning point incidental to the work.

Further, the warning-information generating unit 142a can easily generate the warning information CP3 using the procedure management table 122 that stores association between a procedure and information concerning an accident and a near miss in the past in the procedure. Similarly, the procedure managing unit 144 can easily generate the procedure information CP4 using the procedure management table 122 that stores association between a procedure and content that the user should carry out in the procedure.

After displaying the warning information and the procedure information, in step S212 in FIG. 13, the procedure managing unit 144 determines whether there is limitation on transition to the next procedure. Specifically, the procedure managing unit 144 refers to an entry indicating the present procedure of the procedure management table 122. When a value of the limitation field of the entry is "No", the procedure managing unit 144 determines that there is no limitation on transition to the next procedure. In other cases, the procedure managing unit 144 determines that there is limitation on transition to the next procedure. When determining that there is no limitation on the next procedure (NO in step S212), the procedure managing unit 144 transitions the processing to step S218.

When determining that there is limitation on transition to the next step (YES in step S212), the procedure managing unit 144 executes check processing (step S214). The check processing is processing carried out between the present procedure and transition to the next procedure in order to check safety of work. Content of the check processing can be arbitrarily set. Processing equivalent to post-check concerning the present procedure and processing equivalent to pre-check concerning the next procedure can be adopted. In this embodiment, roughly two kinds of processing explained below can be performed in the check processing.

(I) Processing for acquiring an indication of intension of "check" from the user.

(II) Processing for recognizing an outside scene image acquired by the camera 61 (the image acquiring unit) and checking whether a result of the image recognition satisfies conditions set in advance or processing for analyzing a temperature distribution image acquired by the thermography 62 (the image acquiring unit) and checking whether a result of the image analysis satisfies conditions set in advance. It is determined according to a value of the limitation field of the procedure management table 122 which of the processing (I) and the processing (II) the procedure managing unit 144 executes in step S214.

Figure 17:
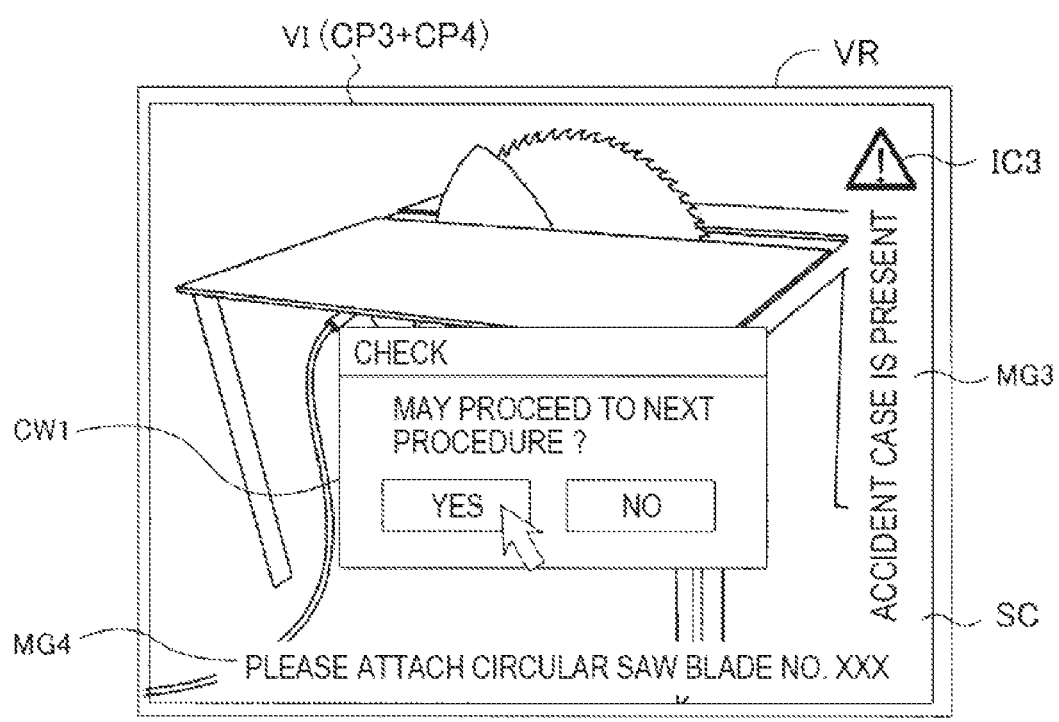
FIG. 17 is an explanatory diagram for explaining processing (I).

FIG. 17 is an explanatory diagram for explaining the processing (I). The processing (I) is processing for acquiring an indication of intention of "check" from the user. The processing (I) is executed when a value of the limitation field is "OK operation" in the example of the procedure management table 122 shown in FIG. 12. The procedure managing unit 144 generates an image for check CW1 for acquiring an indication of intention of "check" from the user and transmits the image for check CW1 to the image processing unit 160. The image for check CW1 includes a message for asking whether the procedure managing unit 144 may proceed to the next procedure, a YES button, and a NO button. The image processing unit 160 generates a combined image including the warning information CP3 and the procedure information CP4, which are already received, and the received image for check CW1 as layers and executes the display processing explained with reference to FIG. 2 on the generated combined image. As a result, as shown in FIG. 17, the image for check CW1 is displayed as the virtual image VI in addition to the warning information CP3 and the procedure information CP4 in the visual field VR of the user of the head mounted display 100a. In FIG. 17, for convenience of illustration, an outside scene portion seen through the message MG3, the message MG4, and the image for check CW1 is not shown.

The user of the head mounted display 100a operates the touch pad 14 or the cross key 16 of the control unit 10 and presses the YES button. The control unit 10 transmits input content by the touch pad 14 and the cross key 16 to the procedure managing unit 144. The procedure managing unit 144 determines that the procedure managing unit 144 succeeds in the check processing when the YES button is pressed. On the other hand, the procedure managing unit 144 determines that the procedure managing unit 144 fails in the check processing when the NO button is pressed.

Figure 18A:
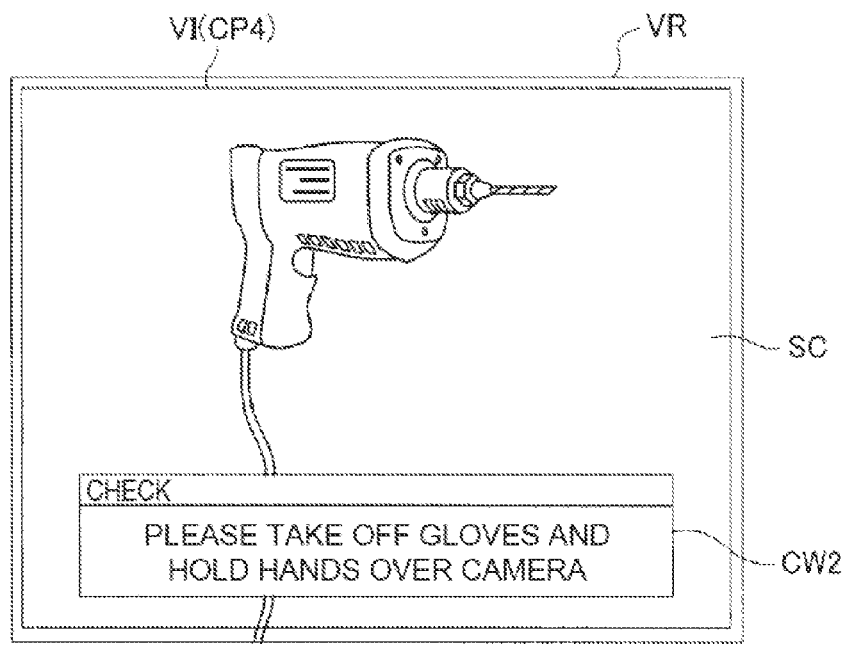
FIGS. 18A and 18B are explanatory diagrams for explaining processing (II).
Figure 18B:
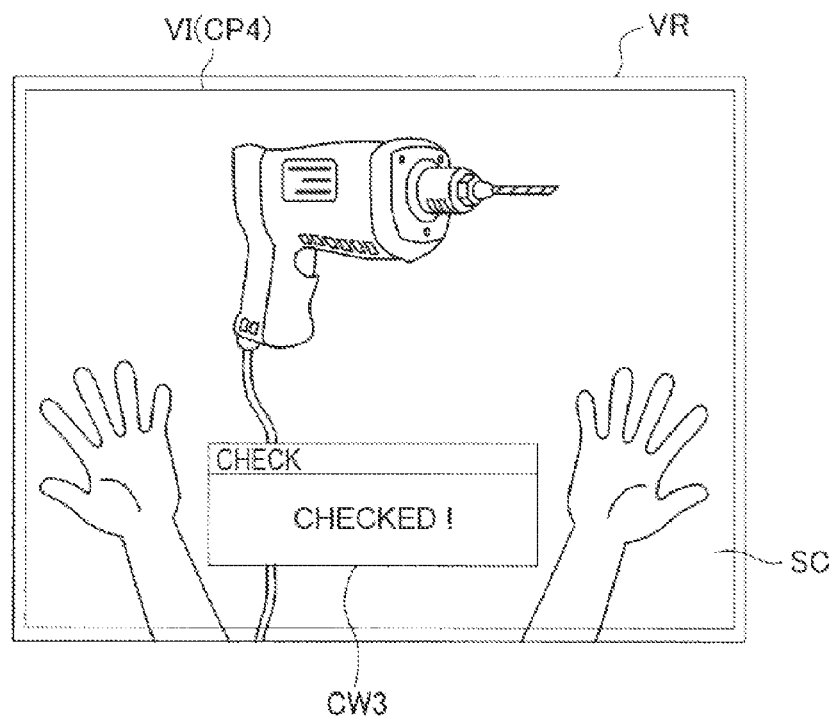

FIGS. 18A and 18B are explanatory diagrams for explaining the processing (II). The processing (II) is processing for recognizing an outside scene image acquired by the camera 61 (the image acquiring unit) and checking whether a result of the image recognition satisfies conditions set in advance or processing for analyzing a temperature distribution image acquired by the thermography 62 (the image acquiring unit) and checking whether a result of the image analysis satisfies conditions set in advance. The "conditions set in advance" vary according to content of the check processing, in other words, a value of the limitation field of the procedure management table 122. In the example of the procedure management table 122 shown in FIG. 12, the processing (II) is executed when a value of the limitation field is "gloves are taken off" or "a work piece is attached". In the following explanation, a value of the limitation field is "gloves are taken off" and image recognition by the camera 61 is adopted as the check processing.

FIG. 18A shows an example of an image for check CW2. Prior to the acquisition of an outside scene image by the camera 61, the procedure managing unit 144 generates the image for check CW2 for giving an instruction to the user and transmits the image for check CW2 to the image processing unit 160. The image for check CW2 includes an instruction message "Please take off the gloves and hold the hands over the camera". Content of the instruction message varies according to content of the check processing, in other words, a value of the limitation field of the procedure management table 122. The instruction message is not limited to a character string and may be a photograph or an illustration. The image processing unit 160, which receives the image for check CW2, performs processing same as the processing shown in FIG. 17. As a result, the warning information CP3, the procedure information CP4, and the image for check CW2 are displayed as the virtual image VI in the visual field VR of the user. In FIG. 18A, for convenience of illustration, an outside scene portion seen through the image for check CW2 is not shown.

The user of the head mounted display 100a takes off the gloves and holds the hands over the camera 61 according to the instruction message. After a predetermined time elapses from the transmission of the image for check CW2, the procedure managing unit 144 instructs the camera 61 to perform image pickup and acquires an outside scene image picked up by the camera 61. The procedure managing unit 144 recognizes the acquired outside scene image to thereby recognize the bare hands of the user. The procedure managing unit 144 determines that the procedure managing unit 144 succeeds in the check processing when the bare hands can be recognized. On the other hand, the procedure managing unit 144 determines that the procedure managing unit 144 fails in the check processing when the bare hands cannot be recognized. When the procedure managing unit 144 succeeds in the check processing, the procedure managing unit 144 may display an image for check CW3 shown in FIG. 18B. The image for check CW3 includes a message indicating that the procedure managing unit 144 succeeds in the check processing. In FIG. 18B, for convenience of illustration, an outside scene portion seen through the image for check CW3 is not shown.

In step S216 in FIG. 13, the procedure managing unit 144 determines whether the procedure managing unit 144 succeeds in the check processing. When the procedure managing unit 144 fails in the check processing (NO in step S216), the procedure managing unit 144 transitions the processing to step S214 and tries the check processing again. When the procedure managing unit 144 succeeds in the check processing (YES in step S216), the procedure managing unit 144 transitions the processing to step S218.

The procedure managing unit 144 determines whether the processing ends concerning all the procedures (step S218). Specifically, the procedure managing unit 144 determines whether the processing in steps S202 to S218 ends concerning all the entries having the same work number in the procedure management table 122. When determining that the processing concerning all the procedures does not end yet (NO in step S218), the procedure managing unit 144 transitions the processing to step S202, specifies the next procedure as "the present procedure", and repeats the processing explained above. When determining that the processing ends concerning all the procedures (YES in step S218), the procedure managing unit 144 ends the processing.

The processing (I) and (II) explained with reference to FIGS. 18A and 18B can be modified as explained below.

The procedure managing unit 144 may properly use the processing (I) and (II) according to characteristics of the user. The characteristics of the user include at least any one of age, sex, physique, and proficiency in work.

For example, the procedure managing unit 144 may execute the processing (I) when the proficiency of the user is high and execute the processing (II) when the proficiency of the user is low. Consequently, the procedure managing unit 144 can perform fine check processing corresponding to the characteristics of the user.

In the processing (II), the procedure managing unit 144 may determine an image recognition result of an outside scene image or determine an image analysis result of a temperature distribution image using different conditions corresponding to the characteristics of the user.

For example, according to the proficiency of the user, the procedure managing unit 144 may properly use conditions for, for example, determining that the procedure managing unit 144 succeeds in the check processing when the procedure managing unit 144 can recognize that the both hands are the bare hands, determining that the procedure managing unit 144 succeeds in the check processing when the procedure managing unit 144 can recognize that at least one hand is the bare hand, and determining that the procedure managing unit 144 succeeds in the check processing even when the user wears the gloves on both the hands. Consequently, the procedure managing unit 144 can perform fine check processing corresponding to the characteristics of the user.

In the processing (II), the procedure managing unit 144 may analyze a temperature distribution image acquired by the thermography 62 and check safety of work. For example, the procedure managing unit 144 causes the thermography 62 to acquire a temperature distribution image around the feet of the user using the image for check CW2. The procedure managing unit 144 may analyze the acquired temperature distribution image and checks whether the temperature of a toe portion is not equal to or higher than a predetermined temperature to thereby determine whether the user wears safety shoes. Consequently, the procedure managing unit 144 can execute the check processing from the viewpoint of "temperature" as well.

As explained above, in steps S212 to S216 of the procedure management processing (FIG. 13) in the second embodiment, after generating the procedure information CP4 for informing the present procedure, the procedure managing unit 144 performs the predetermined check processing before transitioning to generation of the procedure information CP4 for informing the next procedure. Therefore, in the head mounted display 100a (the head-mounted display device) in the second embodiment, it is possible to improve safety of work in a procedure. Specifically, if the processing (I) in the predetermined check processing in step S214 is adopted, the procedure managing unit 144 can improve safety of work in a procedure by performing some kind of check for the user between the present procedure and the next procedure and acquiring an indication of intension of check from the user. If the processing (II) in the predetermined processing in step S214 is adopted, the procedure managing unit 144 can improve safety of work in a procedure by recognizing an image in the visual field direction of the user between the present procedure and the next procedure and checking whether a result of the image recognition satisfies conditions set in advance.

B-3. Additional Processing in the Procedure Management Processing

In the procedure management processing (FIG. 13), additional processing 1 to 3 explained below may be further performed. The additional processing 1 to 3 may be independently added or may be added in combination.

B-3-1. Additional Processing 1

In the additional processing 1, calibration of the display area of a virtual image and the acquisition area of the image acquiring unit (the camera 61 or the thermography 62) is performed. The warning-information generating unit 142a and the procedure managing unit 144 perform processing explained in A to F and G1 below prior to the procedure management processing (FIG. 13).

Processing (A) to (F) is the same as the processing in the first embodiment. Therefore, explanation of the processing (A) to (F) is omitted. In the following explanation, the warning-information generating unit 142 is replaced with the warning-information generating unit 142a.

(G1) In step S206 of the procedure management processing (FIG. 13), the warning-information generating unit 142a generates the warning information CP3 corresponding to the overlapping area. In step S218 of the procedure management processing, the procedure managing unit 144 generates the procedure information CP4 corresponding to the overlapping area.

Consequently, the procedure managing unit 144 and the warning-information generating unit 142a respectively generate the procedure information CP4 and the warning information CP3 with respect to the overlapping area where the display area of the virtual image VI and the acquisition area of the camera 61 and the thermography 62 (the image acquiring unit) overlap each other. Therefore, it is possible to reduce the occurrence of "a shift between an image directly viewed by the user in the visual field of the user and the virtual image VI that the user is caused to visually recognize by the image display unit 20", which is the problem that occurs in the transmissive head mounted display 100 (the head-mounted display device). As a result, it is possible to reduce a sense of discomfort given to the user when the user is caused to visually recognize the procedure information CP4 and the warning information CP3 as the virtual image.

B-3-2. Additional Processing 2

In the additional processing 2, attention of the user of the head mounted display 100a is called using sound. The warning-information generating unit 142a performs processing explained in H1 and J1 below in the procedure management processing (FIG. 13).

(H1) In step S206 of the procedure management processing (FIG. 13), the warning-information generating unit 142a generates sound data for calling attention in addition to the generation of the warning information CP3. It is preferable that the sound data is changed according to presence or absence of values of the near miss case field and the accident case field of the procedure management table 122. For example, when a value of the near miss case field is "Yes" and a value of the accident case field is "No", the warning-information generating unit 142a generates sound data such as "A near miss case occurred in the past in this procedure. Please be careful."

(J1) In step S210 of the procedure management processing, the warning-information generating unit 142a transmits the sound data generated in the processing H1 to the sound processing unit 170 in addition to the warning information. The sound processing unit 170, which receives the sound data, supplies sound signals to the speaker (the sounding body) of the right earphone 32 and the speaker (the sounding body) of the left earphone 34 on the basis of the acquired sound data.

Consequently, the warning-information generating unit 142a can further call attention of the user of the head mounted display 100a through sound. Generation of sound data by the procedure managing unit 144 can also be added. The sound data generated by the procedure managing unit 144 is obtained by converting content informed by the procedure information CP4 into sound.

B-3-3. Additional Processing 3

In the additional processing 3, attention of the user of the head mounted display 100a is called using stimulation through a tactile sense. In order to realize the additional processing 3, the head mounted display 100a shown in FIG. 11 includes a pressurizing unit and a vibrating motor on the inner sides of the right holding unit 21 and the left holding unit 23. Details are the same as the details explained in "A-3-3. Additional processing 3" in the first embodiment. In step S210 of the procedure management processing (FIG. 13), the warning-information generating unit 142a actuates the pressurizing unit and the vibrating motor in addition to the transmission of the warning information. At this point, the warning-information generating unit 142a may change a driving level (pressurizing strength) of the pressurizing unit and a driving level (vibration strength and a vibration period) of the vibrating motor according to presence or absence of values of the near miss case field and the accident case field of the procedure management table 122.

Consequently, the warning-information generating unit 142a can further call attention of the user of the head mounted display 100a using the stimulation through a tactile sense.

C. Modifications

In the embodiments, a part of the components realized by hardware may be replaced with software. Conversely, a part of the components realized by software may be replaced with hardware. Besides, modifications explained below are also possible.

Modification 1

In the embodiments, the configuration of the head mounted display is illustrated. However, the configuration of the head mounted display can be arbitrarily set without departing from the spirit of the invention. For example, addition, deletion, conversion, and the like of the components can be performed.

The allocation of the components to the control unit and the image display unit in the embodiments is only an example. Various forms can be adopted. For example, forms explained below may be adopted: (i) a form in which the processing functions such as the CPU and the memory are mounted on the control unit and only the display function is mounted on the image display unit, (ii) a form in which the processing functions such as the CPU and the memory are mounted on both of the control unit and the image display unit, (iii) a form in which the control unit and the image display unit are integrated (e.g., a form in which the control unit is included in the image display unit and functions as a wearable computer of an eyeglass type), (iv) a form in which a smart phone or a portable game machine is used instead of the control unit, and (v) a form in which the connecting unit (the cords) is removed by configuring the control unit and the image display unit to be capable of communicating by radio and receiving power supply wirelessly.

In the embodiments, for convenience of explanation, the control unit includes the transmitting unit and the image display unit includes the receiving unit. However, both of the transmitting unit and the receiving unit in the embodiments have a function for enabling bidirectional communication and can function as a transmitting and receiving unit.

For example, the configurations of the control unit and the image display unit shown in FIG. 2 can be arbitrarily changed. Specifically, for example, the touch pad may be removed from the control unit. The control unit may be operated only by the cross key. The control unit may include another interface for operation such as a stick for operation. Devices such as a keyboard and a mouse may be connectable to the control unit. The control unit may receive inputs from the keyboard and the mouse.

For example, the control unit shown in FIG. 2 is connected to the image display unit via a wired signal transmission line. However, the control unit and the image display unit may be connected by connection via a wireless signal transmission line such as a wireless LAN, infrared communication, or a Bluetooth (registered trademark).

For example, the head mounted display is the transmissive head mounted display of the binocular type. However, the head mounted display may be a head mounted display of a monocular type. The head mounted display may be configured as a nontransmissive head mounted display by which transmission of an outside scene is blocked in a state in which the user wears the head mounted display.

Figure 19A:
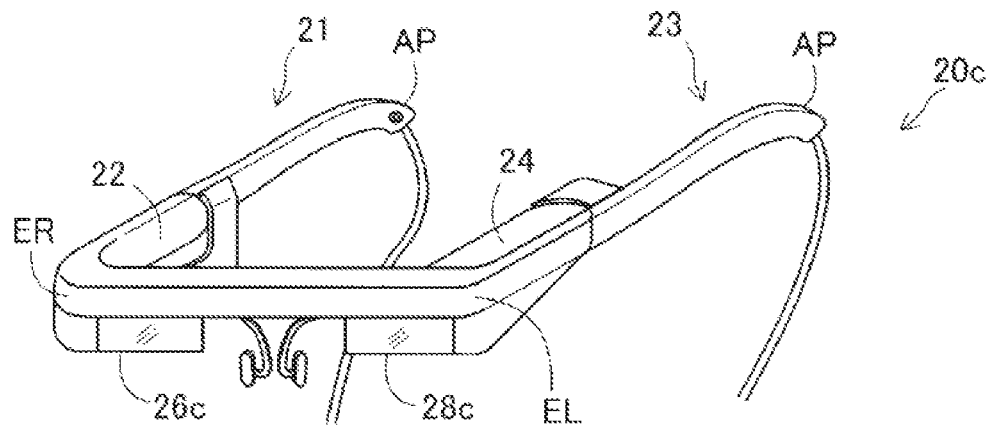
FIGS. 19A and 19B are explanatory diagrams showing the external configurations of head mounted displays in modifications.
Figure 19B:
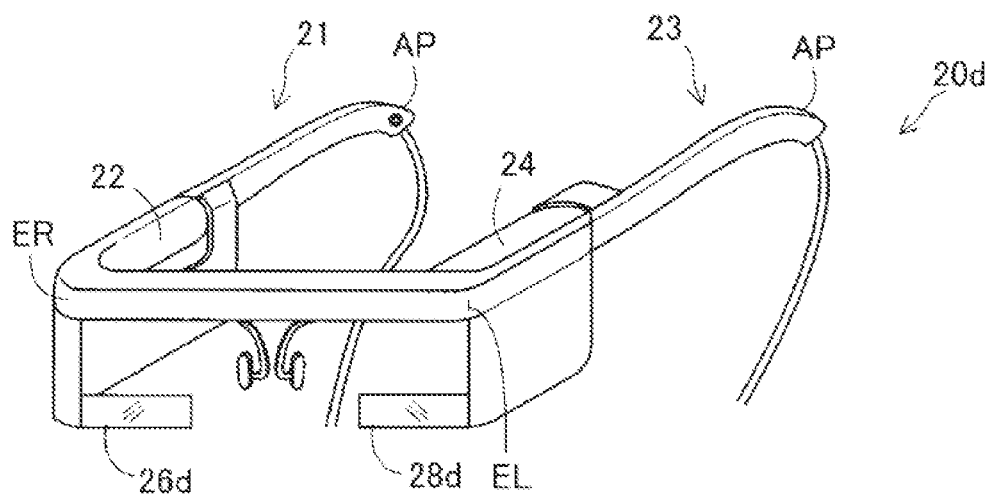

FIGS. 19A and 19B are explanatory diagrams showing the external configurations of head mounted displays in modifications. In the case of an example shown in FIG. 19A, the head mounted display is different from the head mounted display 100 shown in FIG. 1 in that an image display unit 20c includes a right optical-image display unit 26c instead of the right optical-image display unit 26 and includes a left optical-image display unit 28c instead of the left optical-image display unit 28. The right optical-image display unit 26c is formed smaller than the optical member in the first embodiment and arranged obliquely above the right eye of the user when the user wears the head mounted display. Similarly, the left optical-image display unit 28c is formed smaller than the optical member in the first embodiment and arranged obliquely above the left eye of the user when the user wears the head mounted display. In the case of an example shown in FIG. 19B, the head mounted display is different from the head mounted display 100 shown in FIG. 1 in that an image display unit 20d includes a right optical-image display unit 26d instead of the right optical-image display unit 26 and includes a left optical-image display unit 28d instead of the left optical-image display unit 28. The right optical-image display unit 26d is formed smaller than the optical member in the first embodiment and arranged obliquely below the right eye of the user when the user wears the head mounted display. The left optical-image display unit 28d is formed smaller than the optical member in the first embodiment and arranged obliquely below the left eye of the user when the user wears the head mounted display. In this way, the optical-image display unit only has to be arranged near the eye of the user. The size of the optical member forming the optical-image display unit is also arbitrary. The head mounted display can be realized as a head mounted display in a form in which the optical-image display unit covers only a part of the eye of the user, in other words, a form in which the optical-image display unit does not completely cover the eye of the user.

The functional units such as the image processing unit, the display control unit, the warning-information generating unit, the procedure managing unit, and the sound processing unit are described as being realized by the CPU expanding the computer program stored in the ROM or the hard disk on the RAM and executing the computer program. However, the functional units may be configured using an ASIC (Application Specific Integrated Circuit) designed for realizing the functions.

For example, in the embodiments, the image display unit is the head mounted display worn like eyeglasses. However, the image display unit may be a normal flat display device (a liquid crystal display device, a plasma display device, an organic EL display device, etc.). In this case, as in the head mounted display, connection between the control unit and the image display unit may be connection via a wired signal transmission line or may be connection via a wireless signal transmission line. Consequently, the control unit can also be used as a remote controller of the normal flat display device.

As the image display unit, an image display unit having another shape such as an image display unit worn like a hat may be adopted instead of the image display unit worn like eyeglasses. As the earphone, an ear hook type or a headband type may be adopted. The earphone may be omitted. The image display unit may be configured as a head-up display (HUD) mounted on a vehicle such as an automobile or an airplane. The image display unit may be configured as a head mounted display built in a body protector such as a helmet.

For example, in the embodiments, the secondary battery is used as the power supply. However, the power supply is not limited to the secondary battery. Various batteries can be used. For example, a primary battery, a fuel battery, a solar battery, and a thermal battery may be used.

For example, in the embodiments, the image-light generating unit is configured using the backlight, the backlight control unit, the LCD, and the LCD control unit. However, the form explained above is only an example. The image-light generating unit may include components for realizing another system together with the components or instead of the components.

For example, the image-light generating unit may be configured to include an organic EL (Electro-Luminescence) display and an organic EL control unit. For example, as the image-light generating unit, a digital micro mirror device or the like can also be used instead of the LCD. For example, the invention can be applied to a head-mounted display device of a laser retinal projection type.

For example, the head mounted display may include an infrared camera instead of the thermography. In this case, the warning-information generating unit can perform processing same as the processing in the embodiments using a temperature distribution image acquired by the infrared camera.

For example, the head mounted display may include an optical filter configured to suppress transmission of light having a tone same as the tone of the symbol (the icon image, the figure, or the extracted image) used in the warning information. The head mounted display may include an optical filter having a complementary color of the tone of the symbol used in the warning information. Consequently, since visibility of the symbol used in the warning information increases, it is possible to more clearly inform the user of a place where the user should be careful.

Modification 2

In the first embodiment, an example of the attention calling processing is explained. However, the procedure of the processing shown in FIG. 5 is only an example. Various modifications are possible. For example, a part of the steps may be omitted. Other steps may be further added. The order of the steps to be executed may be changed.

For example, in the first embodiment, the warning point in the visual field direction of the user means a dangerous place or a place where a danger is predicted among places present in the visual field direction of the user. However, the warning point in the visual field direction of the user means not only a dangerous place or a place where a danger is predicted but also a place where, although there is no danger, it is desirable that the user should be careful.

For example, in the first embodiment, as examples of the dangerous place or the place where a danger is predicted, the acute angle portion, the catching portion, and the roll-in portion are illustrated. However, various places can be assumed as the dangerous place or the place where a danger is predicted. For example, a high place, a deep place, a place near an object rotating at high speed, a place where intense light is generated, a place where accidents frequently occur, a place near a dangerous object such as chemical, a place near an obstacle, a place near fire or moisture, or the like may be the dangerous place.

Modification 3

In the second embodiment, an example of the procedure management processing is explained. However, the procedure of the processing shown in FIG. 13 is only an example. Various modifications are possible. For example, a part of the steps may be omitted. Other steps may be further added. The order of the steps to be executed may be changed.

For example, in the explanation of the procedure management processing, as an example of work performed by the user, the manufacturing work for products in the manufacturing industry is illustrated. However, various kinds of work can be assumed as the work performed by the user. Specifically, driving work for an automobile or the like, operation work for a machine tool such as a crane, packing work, cooking work, operation (treatment) work in a medical site, operation work in an electronic apparatus (a PC, etc.), and the like are assumed. In the case of the driving work for an automobile, "route" is equivalent to the "procedure" in the embodiment. In the case of the operation work for a machine tool such as a crane, "driving (operation) procedure" is equivalent to the "procedure" in the embodiment. In the case of the packing work, "process" is equivalent to the "procedure" in the embodiment. In the case of the cooking work, the operation (treatment) in a medical site, and the operation work in an electronic apparatus (a PC, etc.), "procedure" or "task" is equivalent to the "procedure" in the embodiment. That is, the procedure may be expressed by any word as long as the procedure is a step included in work.

For example, in step S202, the procedure managing unit specifies the present procedure by analyzing an outside scene image acquired by the camera. However, instead of the image analysis, the procedure managing unit may specify the present procedure by incrementing an internal variable every time the processing flow shown in FIG. 13 is completed once and collating the variable and a value of the procedure number field of the procedure management table.

For example, in step S206, when at least one of the near miss case and the accident case is "Yes" in the procedure management table, it is determined that a case is present. However, only when the accident case is "Yes", it may be determined that a case is present. The number of near miss cases and the number of accident cases may be stored in the procedure management table. When the number of cases stored in the table exceeds a predetermined number of cases, it may be determined that a case is present. A near miss case and an accident case may be converted into points. When points stored in the table exceed a predetermined value, it may be determined that a case is present. A specific example of the conversion into points is explained. For example, when one near miss is set to 1 point and one accident is set to 3 points, points of a procedure in which two near misses and one accident occurred in the past are 5 points (1 point×2+3 points×1).

For example, in the warning information generated in the second embodiment, only "presence or absence" of a near miss case or an accident case is displayed. However, specific contents of the near miss case and the accident case may be displayed. In a normal state, icons for link to the specific contents of the near miss case and the accident case may be displayed. If even contents of a specific case (e.g., an occurrence state of a case, a cause of occurrence, a recurrence prevention measure) can be displayed, it is possible to utilize the head mounted display in order to not only support work performed by the user but also learn in advance the work performed by the user and a danger incidental to the work.

For example, the predetermined check processing in steps S212 to S216 may be omitted.

Modification 4

The procedure management processing (FIG. 13) in the second embodiment is executed instead of the attention calling processing (FIG. 5) in the first embodiment. However, the attention calling processing (FIG. 5) and the procedure management processing (FIG. 13) may be executed in parallel.

Modification 5

In the embodiments, the examples of the warning information CP1 to CP3 and the procedure information CP4 are explained. However, the images of the warning information CP1 to CP3 and the procedure information CP4 are not limited to the illustration in the embodiments. Various modifications of the warning information CP1 to CP3 and the procedure information CP4 are possible.

Modification 6

In the embodiment, the example of the procedure management table is explained. However, the details of the procedure management table are only an example. Various modifications of the procedure management table are possible. For example, addition, deletion, and change of the fields can be performed. The procedure management table may be divided into a plurality of tables and normalized.

For example, a table for storing details of a near miss case (a near miss case table) may be separately provided. A character string serving as a key of the near miss case table may be stored in the near miss case field of the procedure management table. The same applies to an accident case.

Modification 7

In the example explained in the second embodiment, the head mounted display includes the procedure management table and the procedure managing unit and the procedure management processing (FIG. 13) can be executed without requiring another device. However, the same processing can be realized in a work supporting system including the head mounted display and a server provided on the outside.

For example, the head mounted display includes the procedure managing unit and the server includes the procedure management table. In this case, the procedure managing unit and the warning-information generating unit of the head mounted display access the procedure management table stored in the server and refer to data in the procedure management table. Consequently, a plurality of head mounted displays (head-mounted display devices) can share information of the procedure management table (first and second tables) stored in one server. As a result, compared with the configuration including procedure management tables in the head mounted displays, labor and time required for update of the procedure management tables are reduced.

Modification 8

The invention is not limited to the embodiments, the examples, and the modifications explained above and can be realized in various configurations without departing from the spirit of the invention. For example, the technical features in the embodiments, the examples, and the modifications corresponding to the technical features in the aspects described in the summary can be replaced or combined as appropriate in order to solve a part or all of the problems or in order to attain a part or all of the effects. Unless the technical features are explained in this specification as essential technical features, the technical features can be deleted as appropriate.

The entire disclosure of Japanese Patent Application Nos. 2012-272166, filed Dec. 13, 2012 and 2012-272167, filed Dec. 13, 2012 are expressly incorporated by reference herein.

What is claimed is:

1. A head-mounted display device for enabling a user to simultaneously visually recognize a virtual image and an outside scene of the user's environment, the head-mounted display device comprising:

an image acquiring unit that acquires an image in a visual field direction of the user in a wearing state of the head-mounted display device, the image including an external object;

a warning-information generating unit that:
recognizes a specified part of the external object having an outer shape that coincides with a pattern stored in advance;
determines that the specified part of the external object poses a bodily danger to the user based on the recognition that the outer shape coincides with the pattern; and
generates warning information, which is an image for calling the user's attention, on the basis of the image acquired by the image acquiring unit; and an image display unit that causes the user to visually recognize the warning information as the virtual image,
wherein the warning information generated by the warning-information generating unit includes a predetermined image that is arranged at the specified part of the external object, the predetermined image being an image formed by a figure having a shape that surrounds the outer shape of the specified part of the external object such that portions of the external object other than the specified part are not surrounded by the figure.

2. The head-mounted display device according to claim 1, wherein the warning-information generating unit specifies, from the image acquired by the image acquiring unit, a place where the user needs to be careful and generates warning information in which the predetermined image is arranged near the specified place.

3. The head-mounted display device according to claim 2, wherein
the image acquiring unit detects infrared light radiated from an object and acquires a temperature distribution image representing a distribution of temperature, and
the warning-information generating unit specifies a place where the temperature is equal to or higher than a first threshold in the temperature distribution image acquired by the image acquiring unit and sets the place as the place where the user needs to be careful.

4. The head-mounted display device according to claim 2, wherein
the image acquiring unit detects infrared light radiated from an object and acquires a temperature distribution image representing a distribution of temperature, and
the warning-information generating unit specifies a place where the temperature is equal to or lower than a second threshold in the temperature distribution image acquired by the image acquiring unit and sets the place as the place where the user needs to be careful.

5. The head-mounted display device according to claim 2, wherein
the image acquiring unit acquires an image representing the shape of an object from visible light radiated from the object, and
the warning-information generating unit recognizes the image acquired by the image acquiring unit, specifies the specified part of the external object having the outer shape that coincides with the pattern stored in advance, and sets the specified part of the external object as the place where the user needs to be careful.

6. The head-mounted display device according to claim 1, wherein the outer shape of the specified part of the external object is determined to include an acute angle part.

7. The head-mounted display device according to claim 1, wherein the predetermined image is an image formed by a character, a pattern, or a figure that reminds the user of a warning or a combination of the character, the pattern, and the figure.

8. The head-mounted display device according to claim 1, wherein the figure has a shape corresponding to the outer shape of the specified part of the external object.

9. The head-mounted display device according to claim 3, wherein the predetermined image is an image obtained by extracting, from the temperature distribution image acquired by the image acquiring unit, a place where temperature is equal to or higher than the first threshold or a place where temperature is equal to or lower than the second threshold.

10. The head-mounted display device according to claim 1, wherein the warning-information generating unit generates the warning information for an overlapping area where a display area of the virtual image and an acquisition area of the image acquiring unit overlap each other in the image acquired by the image acquiring unit.

11. The head-mounted display device according to claim 1, further comprising a sounding body, wherein
the warning-information generating unit causes, on the basis of the image acquired by the image acquiring unit, the sounding body to output sound for calling the user's attention.

12. The head-mounted display device according to claim 1, further comprising a tactile stimulation unit configured to apply stimulation through a tactile sense to the user, wherein
the warning-information generating unit actuates, on the basis of the image acquired by the image acquiring unit, the tactile stimulation unit in order to call the user's attention.

13. A control method for a head-mounted display device for enabling a user to simultaneously visually recognize a virtual image and an outside scene of the user's environment, the control method comprising:
acquiring an image in a visual field direction of the user in a wearing state of the head-mounted display device, the image including an external object;
recognizing a specified part of the external object having an outer shape that coincides with a pattern stored in advance;
determining that the specified part of the external object poses a bodily danger to the user based on the recognition that the outer shape coincides with the pattern;
generating warning information, which is an image for calling the user's attention, on the basis of the acquired image; and
causing the user to visually recognize the warning information as the virtual image,
wherein the warning information includes a predetermined image that is arranged at the specified part of the external object, the predetermined image being an image formed by a figure having a shape that surrounds the outer shape of the specified part of the external object such that portions of the external object other than the specified part are not surrounded by the figure.

14. A head-mounted display device for enabling a user to simultaneously visually recognize a virtual image and an outside scene of the user's environment, the head-mounted display device comprising:
a procedure managing unit that generates procedure information, which is an image representing content that the user should carry out, concerning a present procedure;
an image acquiring unit that acquires an image in a visual field direction of the user in a wearing state of the head-mounted display device, the image including an external object;

a warning-information generating unit that:
  recognizes a specified part of an external object having an outer shape that coincides with a pattern stored in advance;
  determines that the specified part of the external object poses a bodily danger to the user based on the recognition that the outer shape coincides with the pattern; and
  generates warning information, which is an image for calling the user's attention, in the present procedure; and
an image display unit that causes the user to visually recognize the procedure information and the warning information as the virtual image,
wherein
  the procedure managing unit specifies, on the basis of the image acquired by the image acquiring unit, the present procedure from a plurality of procedures included in work,
  the procedure managing unit generates the procedure information for an overlapping area where a display area of the virtual image and an acquisition area of the image acquiring unit overlap each other in the image acquired by the image acquiring unit,
  the warning-information generating unit generates the warning information for the overlapping area, and
  the warning-information generating unit specifies, from the overlapping area in the image acquired by the image acquiring unit, that the specified part of the external object poses a bodily danger to the user and generates warning information in which a predetermined image is arranged at the specified part of the external object.

15. The head-mounted display device according to claim 14, wherein the warning-information generating unit generates the warning information when warning point data stored in advance is present in the present procedure.

16. The head-mounted display device according to claim 14, wherein the procedure managing unit generates the procedure information corresponding to the present procedure using association of information representing the procedure included in the work and information representing content that the user should carry out in the procedure.

17. The head-mounted display device according to claim 15, wherein
  the warning point data stored in advance is data associating information representing the procedure included in the work and information concerning at least one of an accident in the past and a near miss in the past in the procedure, and
  the warning-information generating unit generates, using the warning point data, the warning information corresponding to the present procedure.

18. The head-mounted display device according to claim 14, wherein the procedure managing unit limits generation of the procedure information corresponding to a next procedure until the procedure managing unit succeeds in predetermined check processing after generating the procedure information corresponding to the present procedure.

19. The head-mounted display device according to claim 18, wherein the predetermined check processing is acquisition of an indication of intension for check from the user.

20. The head-mounted display device according to claim 18, wherein the predetermined check processing is processing for recognizing the image acquired by the image acquiring unit and checking whether a result of the image recognition satisfies a condition set in advance.

21. The head-mounted display device according to claim 20, wherein the condition set in advance varies according to characteristics of the user including at least any one of age, sex, physique, and proficiency in work of the user.

22. The head-mounted display device according to claim 14, wherein the warning-information generating unit generates different kinds of the warning information when an accident occurred in the past in the present procedure and when a near miss occurred in the past in the present procedure.

23. The head-mounted display device according to claim 14, wherein the warning-information generating unit generates different kinds of the warning information according to characteristics of the user including at least any one of age, sex, physique, and proficiency in work of the user.

24. The head-mounted display device according to claim 17, further comprising a sounding body, wherein
  the warning-information generating unit causes, on the basis of the information concerning at least one of an accident in the past and a near miss in the past corresponding to the present procedure, the sounding body to output sound for calling the user's attention.

25. The head-mounted display device according to claim 17, further comprising a tactile stimulation unit configured to apply stimulation through a tactile sense to the user, wherein
  the warning-information generating unit actuates, on the basis of the information concerning at least one of an accident in the past and a near miss in the past corresponding to the present procedure, the tactile stimulation unit in order to call the user's attention.

26. A control method for a head-mounted display device for enabling a user to simultaneously visually recognize a virtual image and an outside scene of the user's environment, the control method comprising:
  generating procedure information, which is an image representing content that the user should carry out, concerning a present procedure;
  acquiring an image in a visual field direction of the user in a wearing state of the head-mounted display device, the image including an external object;
  recognizing a specified part of an external object having an outer shape that coincides with a pattern stored in advance;
  determining that the specified part of the external object poses a bodily danger to the user based on the recognition that the outer shape coincides with the pattern;
  generating warning information, which is an image for calling the user's attention, in the present procedure; and
  causing the user to visually recognize the procedure information and the warning information as the virtual image,
  wherein
    the present procedure is specified, on the basis of the image acquired, from a plurality of procedures included in work;
    the procedure information is generated for an overlapping area where a display area of the virtual image and an acquisition area of the image acquiring unit overlap each other in the image acquired by the image acquiring unit,
    the warning information is generated for the overlapping area, and
    based on the overlapping area in the image acquired by the image acquiring unit, the specified part of the external object is specified to pose a bodily danger to the user and warning information in which a predetermined image is arranged at the specified part of the external object is generated.

27. A work supporting system, comprising:
the head-mounted display device according to claim 16; and
a server, wherein
the server includes:
- a first table configured to store association of the information representing the procedure included in the work and the information representing content that the user should carry out in the procedure;
- a second table configured to store association of the information representing the procedure included in the work and the information concerning at least one of an accident in the past and a near miss in the past in the procedure; and
- a transmitting unit configured to transmit, according to a request from the head-mounted display device, at least one of the information stored in the first table and the information stored in the second table.

28. The head-mounted display device according to claim 1, wherein the outer shape of the specified part of the external object is determined to include a plurality of acute angle parts.

29. The head-mounted display device according to claim 1, wherein the specified part of the external object is determined to include two or more of an acute angle part, a catching part, and a roll-in part.

* * * * *